(12) United States Patent
Sorbe et al.

(10) Patent No.: US 10,706,397 B2
(45) Date of Patent: *Jul. 7, 2020

(54) TRANSFER ACCOUNT MACHINE, NON-TRANSITORY COMPUTER MEDIUM HAVING COMPUTER PROGRAM, AND ASSOCIATED COMPUTER-IMPLEMENTED METHOD

(71) Applicant: Metabank, Sioux Falls, SD (US)

(72) Inventors: Trent Sorbe, Brookings, SD (US); Troy Larson, Brandon, SD (US)

(73) Assignee: METABANK, Sioux Falls, SD (US)

( * ) Notice: Subject to any disclaimer, the term of this patent is extended or adjusted under 35 U.S.C. 154(b) by 660 days.

This patent is subject to a terminal disclaimer.

(21) Appl. No.: 14/299,338

(22) Filed: Jun. 9, 2014

(65) Prior Publication Data

US 2014/0289114 A1    Sep. 25, 2014

Related U.S. Application Data

(63) Continuation of application No. 12/338,584, filed on Dec. 18, 2008, now Pat. No. 8,788,414, and a
(Continued)

(51) Int. Cl.
*G06Q 20/10* (2012.01)
*G06Q 20/14* (2012.01)
(Continued)

(52) U.S. Cl.
CPC ........... *G06Q 20/108* (2013.01); *G06Q 20/10* (2013.01); *G06Q 20/102* (2013.01);
(Continued)

(58) Field of Classification Search
CPC .... G06Q 20/108; G06Q 20/145; G06Q 40/12; G06Q 20/20; G06Q 20/40; G06Q 20/102;
(Continued)

(56) References Cited

U.S. PATENT DOCUMENTS

| 3,752,904 A | 8/1973 | Waterbury |
| 4,247,759 A | 1/1981 | Yuris et al. |

(Continued)

FOREIGN PATENT DOCUMENTS

| EP | 0397512 A2 | 11/1990 |
| EP | 0619565 A1 | 10/1994 |

(Continued)

OTHER PUBLICATIONS

TreasurySoftware.com Published Jan. 17, 2006. http://www.treasurysoftware.com:80/ach_file_format.html . Retrieved online on Sep. 5, 2017 from «https://web.archive.org/web/20060117070307/http://www.treasurysoftware.com:80/ach_file_format.html », hereinafter Treasury Software. 5 pages.*

(Continued)

*Primary Examiner* — Florian M Zeender
*Assistant Examiner* — Whitney Poffenbarger
(74) *Attorney, Agent, or Firm* — Bracewell LLP

(57) ABSTRACT

Embodiments of the present invention include transfer account machines, computer program products, and associated computer-implemented methods of providing prioritized payments from the proceeds of automatic or direct deposits. Embodiments of the present invention include routing automatic deposit information to a financial institution computer managing a prioritized payment program and formulating an outgoing file with both an entry for an automatic deposit destined for a customer account and an entry for a pre-authorized prioritized payment to a select creditor, so that the automatic deposit is credited to the customer account and relatively instantaneously any prioritized payment is debited from the customer account. According to embodiments of the present invention, the customer account can be a prepaid card account so that a
(Continued)

customer has effective access on the prepaid card only to a net value of funds.

18 Claims, 12 Drawing Sheets

Related U.S. Application Data continuation of application No. 13/782,550, filed on Mar. 1, 2013, now Pat. No. 10,068,208, which is a continuation of application No. 13/282,186, filed on Oct. 26, 2011, now Pat. No. 8,392,299, which is a continuation of application No. 12/338,365, filed on Dec. 18, 2008, now Pat. No. 8,055,557.

(60) Provisional application No. 61/052,454, filed on May 12, 2008, provisional application No. 61/016,213, filed on Dec. 21, 2007.

(51) Int. Cl.
  *G06Q 20/20* (2012.01)
  *G06Q 20/40* (2012.01)
  *G06Q 30/02* (2012.01)
  *G06Q 40/02* (2012.01)
  *G06Q 40/00* (2012.01)

(52) U.S. Cl.
  CPC ......... *G06Q 20/105* (2013.01); *G06Q 20/145* (2013.01); *G06Q 20/20* (2013.01); *G06Q 20/40* (2013.01); *G06Q 30/02* (2013.01); *G06Q 40/00* (2013.01); *G06Q 40/02* (2013.01); *G06Q 40/12* (2013.12)

(58) Field of Classification Search
  CPC ........ G06Q 40/00; G06Q 40/02; G06Q 20/10; G06Q 20/105; G06Q 30/02
  See application file for complete search history.

(56) References Cited

U.S. PATENT DOCUMENTS

| | | |
|---|---|---|
| 4,334,307 A | 6/1982 | Bourgeois et al. |
| 4,439,636 A | 3/1984 | Newkirk et al. |
| 4,449,040 A | 5/1984 | Matsuoka et al. |
| 4,528,643 A | 7/1985 | Freeny, Jr. |
| 4,532,416 A | 7/1985 | Berstein |
| 4,577,061 A | 3/1986 | Katzeff et al. |
| 4,625,276 A | 11/1986 | Benton et al. |
| 4,677,565 A | 6/1987 | Ogaki et al. |
| 4,678,895 A | 7/1987 | Tateisi et al. |
| 4,706,275 A | 11/1987 | Kamal |
| 4,722,054 A | 1/1988 | Yorozu et al. |
| 4,727,243 A | 2/1988 | Saver |
| 4,750,201 A | 6/1988 | Hodgson et al. |
| 4,797,540 A | 1/1989 | Kimizu |
| 4,827,113 A | 5/1989 | Rikuna |
| 4,868,900 A | 9/1989 | McGuire |
| 4,877,947 A | 10/1989 | Mori |
| 4,879,744 A | 11/1989 | Tasaki et al. |
| 4,884,212 A | 11/1989 | Stutsman |
| 4,951,308 A | 8/1990 | Bishop et al. |
| 4,968,873 A | 11/1990 | Dethloff et al. |
| 5,012,077 A | 4/1991 | Takano |
| 5,048,085 A | 9/1991 | Abraham et al. |
| 5,050,207 A | 9/1991 | Hitchcock |
| 5,068,891 A | 11/1991 | Marshall |
| 5,101,098 A | 3/1992 | Naito |
| 5,138,650 A | 8/1992 | Stahl et al. |
| 5,146,067 A | 9/1992 | Sloan et al. |
| 5,148,481 A | 9/1992 | Abraham et al. |
| 5,151,582 A | 9/1992 | Fujioka |
| 5,155,342 A | 10/1992 | Urano |
| 5,163,086 A | 11/1992 | Ahearn et al. |
| 5,192,947 A | 3/1993 | Neustein |
| 5,220,593 A | 6/1993 | Zicker et al. |
| 5,221,838 A | 6/1993 | Gutman et al. |
| 5,225,666 A | 7/1993 | Amarena et al. |
| 5,264,689 A | 11/1993 | Maes et al. |
| 5,265,155 A | 11/1993 | Castro |
| 5,266,782 A | 11/1993 | Alanara et al. |
| 5,272,320 A | 12/1993 | Hakamada |
| 5,278,752 A | 1/1994 | Narita et al. |
| 5,285,382 A | 2/1994 | Muehlberger et al. |
| 5,327,482 A | 7/1994 | Yamamoto |
| 5,334,821 A | 8/1994 | Campo et al. |
| 5,340,969 A | 8/1994 | Cox |
| 5,352,876 A | 10/1994 | Watanabe et al. |
| 5,359,182 A | 10/1994 | Schilling |
| 5,409,092 A | 4/1995 | Itako et al. |
| 5,416,306 A | 5/1995 | Imahata |
| 5,438,186 A | 8/1995 | Nair et al. |
| 5,442,567 A | 8/1995 | Small |
| 5,448,044 A | 9/1995 | Price et al. |
| 5,465,206 A | 11/1995 | Hilt et al. |
| 5,477,038 A | 12/1995 | Levine et al. |
| 5,504,808 A | 4/1996 | Hamrick, Jr. |
| 5,511,114 A | 4/1996 | Stimson et al. |
| 5,513,117 A | 4/1996 | Small |
| 5,531,482 A | 7/1996 | Blank |
| 5,550,358 A | 8/1996 | Tait et al. |
| 5,577,109 A | 11/1996 | Stimson et al. |
| 5,577,121 A | 11/1996 | Davis et al. |
| 5,661,254 A | 8/1997 | Steuer et al. |
| 5,696,908 A | 12/1997 | Muehlberger et al. |
| 5,699,528 A | 12/1997 | Hogan |
| 5,724,575 A | 3/1998 | Hoover et al. |
| 5,732,136 A | 3/1998 | Murphree et al. |
| 5,814,798 A | 9/1998 | Zancho |
| 5,841,365 A | 11/1998 | Rimkus |
| 5,859,419 A | 1/1999 | Wynn |
| 5,870,721 A | 2/1999 | Norris |
| 5,875,437 A | 2/1999 | Atkins |
| 5,878,141 A | 3/1999 | Daly et al. |
| 5,893,907 A | 4/1999 | Ukuda |
| 5,897,620 A | 4/1999 | Walker et al. |
| 5,920,848 A | 7/1999 | Schutzer et al. |
| 5,923,016 A | 7/1999 | Fredregill et al. |
| 5,933,812 A | 8/1999 | Meyer et al. |
| 5,940,812 A | 8/1999 | Tengel et al. |
| 5,963,921 A | 10/1999 | Longfield |
| 6,000,608 A | 12/1999 | Dorf |
| 6,012,635 A | 1/2000 | Shimada et al. |
| 6,021,397 A | 2/2000 | Jones et al. |
| 6,032,859 A | 3/2000 | Muehlberger et al. |
| 6,041,308 A | 3/2000 | Walker et al. |
| 6,065,679 A | 5/2000 | Levie et al. |
| 6,112,191 A | 8/2000 | Burke |
| 6,144,948 A | 11/2000 | Walker et al. |
| 6,154,738 A | 11/2000 | Call |
| 6,189,787 B1 | 2/2001 | Dorf |
| 6,208,978 B1 | 3/2001 | Walker et al. |
| 6,249,773 B1 | 6/2001 | Allard et al. |
| 6,253,998 B1 | 7/2001 | Ziamo |
| 6,304,860 B1 | 10/2001 | Martin, Jr. et al. |
| 6,315,193 B1 | 11/2001 | Hogan |
| 6,330,554 B1 | 12/2001 | Walker et al. |
| 6,450,407 B1 | 9/2002 | Freeman et al. |
| 6,467,684 B2 | 10/2002 | Fite et al. |
| 6,704,714 B1 | 3/2004 | O'Leary et al. |
| 6,739,506 B1 | 5/2004 | Constantine |
| 6,793,131 B2 | 9/2004 | Hogan |
| 6,865,544 B1 | 3/2005 | Austin |
| 6,920,434 B1 | 7/2005 | Cossette |
| 6,999,943 B1 | 2/2006 | Johnson et al. |
| 7,010,507 B1 | 3/2006 | Anderson et al. |
| 7,031,939 B1 | 4/2006 | Gallagher et al. |
| 7,072,862 B1 | 7/2006 | Wilson |
| 7,127,452 B1 | 10/2006 | Yashiro |
| 7,177,829 B1 | 2/2007 | Wilson et al. |
| 7,206,761 B2 | 4/2007 | Colvin |
| 7,252,223 B2 | 8/2007 | Schofield |

(56) References Cited

U.S. PATENT DOCUMENTS

| | | |
|---|---|---|
| 7,258,273 B2 | 8/2007 | Griffin |
| 7,363,265 B2 | 4/2008 | Horgan |
| 7,370,076 B2 | 5/2008 | Friedman et al. |
| 7,392,224 B1 | 6/2008 | Bauer et al. |
| 7,398,919 B2 | 7/2008 | Cooper |
| 7,421,410 B1 | 9/2008 | Schechtman et al. |
| 7,426,492 B1 | 9/2008 | Bishop et al. |
| 7,451,920 B1 | 11/2008 | Rose |
| 7,472,089 B2 | 12/2008 | Hu et al. |
| 7,493,279 B1 | 2/2009 | Kwan |
| 7,509,286 B1 | 3/2009 | Bent et al. |
| 7,546,945 B1 | 6/2009 | Bucci et al. |
| 7,567,936 B1 | 7/2009 | Peckover et al. |
| 7,584,887 B1 | 9/2009 | Sanchez et al. |
| 7,599,879 B2 | 10/2009 | Louie et al. |
| 7,606,918 B2 | 10/2009 | Holzman et al. |
| 7,607,570 B1 | 10/2009 | Constantine |
| 7,628,319 B2 | 12/2009 | Brown et al. |
| 7,645,194 B2 | 1/2010 | Van Luchene et al. |
| 7,653,591 B1 | 1/2010 | Dabney |
| 7,702,583 B1 | 4/2010 | Hamilton et al. |
| 7,702,587 B2 | 4/2010 | Nguyen et al. |
| 7,752,102 B2 | 7/2010 | Thomas |
| 7,757,944 B2 | 7/2010 | Cline et al. |
| 7,783,571 B2 | 8/2010 | Fish et al. |
| 7,792,717 B1 | 9/2010 | Hankins et al. |
| 7,810,735 B2 | 10/2010 | Madani |
| 7,813,955 B2 | 10/2010 | Ariff et al. |
| 7,814,012 B2 | 10/2010 | Johnson |
| 7,856,399 B2 | 12/2010 | Wilkes |
| 7,865,434 B2 | 1/2011 | Sheets |
| 7,873,569 B1 | 1/2011 | Cahn |
| 7,899,750 B1 | 3/2011 | Klieman et al. |
| 7,904,333 B1 | 3/2011 | Perkowski |
| 7,933,833 B2 | 4/2011 | Hotz et al. |
| 7,954,704 B2 | 6/2011 | Gephart et al. |
| 8,024,242 B2 | 9/2011 | Galit |
| 8,046,256 B2 | 10/2011 | Chien et al. |
| 8,051,006 B1 | 11/2011 | Rourk |
| 8,055,557 B2 | 11/2011 | Sorbe et al. |
| 8,065,187 B2 | 11/2011 | Ahlers et al. |
| 8,069,085 B2 | 11/2011 | Ahlers et al. |
| 8,069,435 B1 | 11/2011 | Lai |
| 8,086,494 B2 | 12/2011 | Dooley et al. |
| 8,090,649 B2 | 1/2012 | Galit et al. |
| 8,103,549 B1 | 1/2012 | Ahlers et al. |
| 8,108,272 B2 | 1/2012 | Sorbe et al. |
| 8,108,279 B2 | 1/2012 | Galit et al. |
| 8,108,977 B1 | 2/2012 | Miller |
| 8,150,764 B2 | 4/2012 | Crowe et al. |
| 8,175,962 B2 | 5/2012 | Galit et al. |
| 8,175,972 B2 | 5/2012 | Galit et al. |
| 8,190,480 B1 | 5/2012 | Ahlers et al. |
| 8,214,286 B1 | 7/2012 | Galit et al. |
| 8,244,611 B2 | 8/2012 | Galit |
| 8,244,637 B2 | 8/2012 | Galit et al. |
| 8,260,678 B2 | 9/2012 | Miller |
| 8,266,047 B2 | 9/2012 | Galit |
| 8,286,863 B1 | 10/2012 | Brooks |
| 8,290,853 B2 | 10/2012 | Galit |
| 8,296,227 B2 | 10/2012 | Galit et al. |
| 8,301,557 B1 | 10/2012 | Crowe et al. |
| 8,306,912 B2 | 11/2012 | Galit |
| 8,341,021 B2 | 12/2012 | Ahlers et al. |
| 8,355,984 B1 | 1/2013 | Galit et al. |
| 8,371,502 B1 | 2/2013 | Galit et al. |
| 8,380,623 B1 | 2/2013 | Ley et al. |
| 8,386,375 B2 | 2/2013 | Galit |
| 8,392,299 B2 | 3/2013 | Sorbe et al. |
| 8,392,330 B2 | 3/2013 | Sorbe et al. |
| 8,396,754 B2 | 3/2013 | Dooley et al. |
| 8,403,211 B2 | 3/2013 | Brooks et al. |
| 8,485,441 B2 | 7/2013 | Brooks |
| 8,494,960 B2 | 7/2013 | Galit et al. |
| 8,538,879 B2 | 9/2013 | Galit et al. |
| 8,583,515 B2 | 11/2013 | Sorbe et al. |
| 8,583,549 B1 | 11/2013 | Mohsenzadeh |
| 8,589,295 B2 | 11/2013 | Sorbe et al. |
| 8,602,297 B2 | 12/2013 | Wilen |
| 8,635,131 B1 | 1/2014 | Saunders |
| 8,636,203 B1 | 1/2014 | Patterson et al. |
| 8,725,644 B2 | 5/2014 | Schlesser et al. |
| 9,875,491 B2 | 1/2018 | Weksler |
| 2001/0013542 A1 | 8/2001 | Horowitz et al. |
| 2001/0021925 A1 | 9/2001 | Ukigawa et al. |
| 2001/0032251 A1 | 10/2001 | Rhoads et al. |
| 2001/0034663 A1 | 10/2001 | Teveler et al. |
| 2001/0034676 A1 | 10/2001 | Vasic |
| 2001/0042785 A1 | 11/2001 | Walker et al. |
| 2001/0051900 A1 | 12/2001 | Fisher et al. |
| 2002/0002075 A1 | 1/2002 | Rowe |
| 2002/0032612 A1 | 3/2002 | Williams et al. |
| 2002/0038285 A1 | 3/2002 | Golden et al. |
| 2002/0042744 A1 | 4/2002 | Kohl |
| 2002/0055904 A1 | 5/2002 | Mon |
| 2002/0055909 A1 | 5/2002 | Fung et al. |
| 2002/0072942 A1 | 6/2002 | Kuykendall et al. |
| 2002/0077971 A1 | 6/2002 | Allred |
| 2002/0107797 A1 | 8/2002 | Combaluzier |
| 2002/0111886 A1 | 8/2002 | Chenevich et al. |
| 2002/0133445 A1 | 9/2002 | Lessin |
| 2002/0138415 A1 | 9/2002 | Siska |
| 2002/0152161 A1 | 10/2002 | Aoike |
| 2002/0194122 A1 | 12/2002 | Knox et al. |
| 2002/0194124 A1 | 12/2002 | Hobbs et al. |
| 2003/0001005 A1 | 1/2003 | Risafi et al. |
| 2003/0004997 A1 | 1/2003 | Parker et al. |
| 2003/0017865 A1 | 1/2003 | Beaulieu et al. |
| 2003/0018568 A1 | 1/2003 | Chen |
| 2003/0053609 A1 | 3/2003 | Risafi et al. |
| 2003/0055782 A1 | 3/2003 | Slater |
| 2003/0061170 A1 | 3/2003 | Uzo |
| 2003/0074311 A1 | 4/2003 | Saylors et al. |
| 2003/0097331 A1 | 5/2003 | Cohen |
| 2003/0120553 A1 | 6/2003 | Williams |
| 2003/0135459 A1* | 7/2003 | Abelman .......... G06Q 20/02 705/40 |
| 2003/0144935 A1 | 7/2003 | Sobek |
| 2003/0150142 A1 | 8/2003 | Street |
| 2003/0158811 A1 | 8/2003 | Sanders et al. |
| 2003/0167225 A1 | 9/2003 | Adams |
| 2003/0191702 A1 | 10/2003 | Hurley |
| 2003/0191714 A1 | 10/2003 | Norris |
| 2003/0197059 A1 | 10/2003 | Tidball et al. |
| 2003/0200118 A1 | 10/2003 | Lee et al. |
| 2003/0208443 A1 | 11/2003 | Mersky |
| 2003/0217003 A1 | 11/2003 | Weinflash et al. |
| 2004/0036215 A1 | 2/2004 | Butler, II |
| 2004/0047459 A1 | 3/2004 | Diaz |
| 2004/0098351 A1 | 5/2004 | Duke |
| 2004/0111370 A1 | 6/2004 | Saylors et al. |
| 2004/0117250 A1 | 6/2004 | Lubow et al. |
| 2004/0117302 A1 | 6/2004 | Weichert et al. |
| 2004/0122736 A1 | 6/2004 | Strock et al. |
| 2004/0133515 A1 | 7/2004 | McCoy et al. |
| 2004/0143527 A1 | 7/2004 | Benkert et al. |
| 2004/0148252 A1 | 7/2004 | Fleishman |
| 2004/0153407 A1 | 8/2004 | Clubb et al. |
| 2004/0158522 A1 | 8/2004 | Brown et al. |
| 2004/0167821 A1 | 8/2004 | Baumgartner |
| 2004/0181481 A1 | 9/2004 | Carter |
| 2004/0188221 A1 | 9/2004 | Carter |
| 2004/0199463 A1 | 10/2004 | Deggendorf |
| 2004/0205138 A1 | 10/2004 | Friedman et al. |
| 2004/0210484 A1 | 10/2004 | Lee |
| 2004/0211830 A1 | 10/2004 | Algiene |
| 2004/0215554 A1 | 10/2004 | Kemper et al. |
| 2004/0225545 A1 | 11/2004 | Turner et al. |
| 2004/0230523 A1 | 11/2004 | Johnson |
| 2004/0235542 A1 | 11/2004 | Stronach et al. |
| 2004/0236646 A1 | 11/2004 | Wu et al. |
| 2004/0249752 A1 | 12/2004 | Prato et al. |
| 2005/0004839 A1 | 1/2005 | Bakker et al. |
| 2005/0015332 A1 | 1/2005 | Chen |

(56) References Cited

U.S. PATENT DOCUMENTS

| | | |
|---|---|---|
| 2005/0021363 A1 | 1/2005 | Stimson et al. |
| 2005/0049974 A1 | 3/2005 | Jani et al. |
| 2005/0060257 A1 | 3/2005 | Fry |
| 2005/0071230 A1 | 3/2005 | Mankoff |
| 2005/0075939 A1 | 4/2005 | Bao et al. |
| 2005/0077350 A1 | 4/2005 | Courtion et al. |
| 2005/0082364 A1 | 4/2005 | Alvarez et al. |
| 2005/0108121 A1 | 5/2005 | Gravett et al. |
| 2005/0108164 A1 | 5/2005 | Salafia, III et al. |
| 2005/0167481 A1 | 8/2005 | Hansen et al. |
| 2005/0167487 A1 | 8/2005 | Conlon et al. |
| 2005/0173520 A1 | 8/2005 | Jaros et al. |
| 2005/0177489 A1 | 8/2005 | Neff et al. |
| 2005/0177502 A1 | 8/2005 | Thomas |
| 2005/0203837 A1 | 9/2005 | Leigh et al. |
| 2005/0205663 A1 | 9/2005 | Algiene |
| 2005/0211765 A1* | 9/2005 | Brown .............. G06Q 20/102 235/379 |
| 2005/0228724 A1 | 10/2005 | Frangiosa |
| 2005/0247798 A1 | 11/2005 | Graves et al. |
| 2005/0273430 A1 | 12/2005 | Pliha |
| 2005/0274798 A1 | 12/2005 | Bacastow |
| 2005/0278188 A1 | 12/2005 | Thomson et al. |
| 2005/0278347 A1 | 12/2005 | Wolf et al. |
| 2005/0283436 A1 | 12/2005 | Greer et al. |
| 2005/0289044 A1 | 12/2005 | Breslin et al. |
| 2006/0054682 A1 | 3/2006 | de la Huerga |
| 2006/0059085 A1 | 3/2006 | Tucker |
| 2006/0074804 A1 | 4/2006 | Cinar |
| 2006/0085269 A1 | 4/2006 | Guilfoyle |
| 2006/0085334 A1 | 4/2006 | Murphy |
| 2006/0100914 A1 | 5/2006 | Jafri et al. |
| 2006/0113376 A1 | 6/2006 | Reed et al. |
| 2006/0149665 A1 | 7/2006 | Weksler |
| 2006/0149670 A1 | 7/2006 | Nguyen et al. |
| 2006/0161499 A1 | 7/2006 | Rich et al. |
| 2006/0169784 A1 | 8/2006 | Collins et al. |
| 2006/0190322 A1 | 8/2006 | Oehlerking et al. |
| 2006/0206402 A1 | 9/2006 | Sullivan |
| 2006/0210753 A1 | 9/2006 | Kadlec |
| 2006/0212392 A1 | 9/2006 | Brown |
| 2006/0212393 A1 | 9/2006 | Brown |
| 2006/0224502 A1 | 10/2006 | McGowan |
| 2006/0247975 A1 | 11/2006 | Shapiro et al. |
| 2006/0249570 A1 | 11/2006 | Seifert et al. |
| 2006/0249870 A1 | 11/2006 | Tachauer |
| 2006/0259364 A1 | 11/2006 | Strock et al. |
| 2006/0259957 A1 | 11/2006 | Tam et al. |
| 2006/0282356 A1 | 12/2006 | Andres et al. |
| 2006/0282374 A1 | 12/2006 | Stone |
| 2006/0293947 A1 | 12/2006 | Nicholson |
| 2006/0293966 A1 | 12/2006 | Inouye |
| 2007/0000997 A1 | 1/2007 | Lambert et al. |
| 2007/0005416 A1 | 1/2007 | Jackson et al. |
| 2007/0011089 A1 | 1/2007 | Deschryver |
| 2007/0038515 A1 | 2/2007 | Postrel |
| 2007/0038924 A1 | 2/2007 | Beyer et al. |
| 2007/0045401 A1 | 3/2007 | Sturm |
| 2007/0061206 A1 | 3/2007 | Lefebvre |
| 2007/0061248 A1 | 3/2007 | Shavit et al. |
| 2007/0075134 A1 | 4/2007 | Perlow et al. |
| 2007/0083462 A1 | 4/2007 | Cubillo et al. |
| 2007/0087819 A1 | 4/2007 | Van Luchene et al. |
| 2007/0090183 A1 | 4/2007 | Hursta et al. |
| 2007/0100745 A1 | 5/2007 | Keiser |
| 2007/0100746 A1 | 5/2007 | Blair et al. |
| 2007/0100748 A1 | 5/2007 | Dheer et al. |
| 2007/0106603 A1 | 5/2007 | Whyte et al. |
| 2007/0136194 A1 | 6/2007 | Sloan |
| 2007/0152038 A1 | 7/2007 | Ciancio et al. |
| 2007/0168265 A1 | 7/2007 | Rosenberger |
| 2007/0174189 A1 | 7/2007 | Bishop et al. |
| 2007/0175982 A1 | 8/2007 | Bonalle et al. |
| 2007/0175984 A1 | 8/2007 | Khandaker et al. |
| 2007/0192237 A1 | 8/2007 | Duoos et al. |
| 2007/0194113 A1 | 8/2007 | Esplin et al. |
| 2007/0198352 A1 | 8/2007 | Kannegiesser |
| 2007/0198354 A1 | 8/2007 | Senghore et al. |
| 2007/0198403 A1 | 8/2007 | Aloni et al. |
| 2007/0215699 A1 | 9/2007 | Arego et al. |
| 2007/0233596 A1 | 10/2007 | Ambrose |
| 2007/0244778 A1 | 10/2007 | Bailard |
| 2007/0250380 A1 | 10/2007 | Mankoff |
| 2007/0252010 A1 | 11/2007 | Gonzalez et al. |
| 2007/0260536 A1 | 11/2007 | Stone |
| 2007/0262140 A1 | 11/2007 | Long, Sr. |
| 2007/0265957 A1 | 11/2007 | Advani et al. |
| 2007/0265960 A1 | 11/2007 | Advani et al. |
| 2007/0267479 A1 | 11/2007 | Nix et al. |
| 2007/0271178 A1 | 11/2007 | Davis et al. |
| 2007/0276736 A1 | 11/2007 | Guilfoyle |
| 2007/0282740 A1 | 12/2007 | Wendt |
| 2007/0288354 A1 | 12/2007 | Leclair et al. |
| 2008/0005001 A1 | 1/2008 | Davis et al. |
| 2008/0021772 A1 | 1/2008 | Aloni et al. |
| 2008/0040261 A1 | 2/2008 | Nix et al. |
| 2008/0040265 A1 | 2/2008 | Rackley, III et al. |
| 2008/0052189 A1 | 2/2008 | Walker et al. |
| 2008/0052224 A1 | 2/2008 | Parker |
| 2008/0059306 A1 | 3/2008 | Fordyce et al. |
| 2008/0059363 A1 | 3/2008 | Hotz et al. |
| 2008/0065532 A1 | 3/2008 | De La Motte |
| 2008/0082418 A1 | 4/2008 | Fordyce et al. |
| 2008/0091519 A1 | 4/2008 | Foss |
| 2008/0103627 A1 | 5/2008 | Torian |
| 2008/0103968 A1 | 5/2008 | Bies et al. |
| 2008/0103970 A1 | 5/2008 | Books et al. |
| 2008/0120129 A1 | 5/2008 | Seubert et al. |
| 2008/0140561 A1 | 6/2008 | Neel |
| 2008/0140568 A1 | 6/2008 | Henry |
| 2008/0140576 A1 | 6/2008 | Lewis et al. |
| 2008/0154702 A1 | 6/2008 | Pleban |
| 2008/0162271 A1 | 7/2008 | Benjamin |
| 2008/0162337 A1 | 7/2008 | Greenland et al. |
| 2008/0195541 A1 | 8/2008 | Battaglini et al. |
| 2008/0197192 A1 | 8/2008 | Lindahl et al. |
| 2008/0210753 A1 | 9/2008 | Plozay et al. |
| 2008/0228582 A1 | 9/2008 | Fordyce et al. |
| 2008/0228643 A1 | 9/2008 | Hall |
| 2008/0235095 A1 | 9/2008 | Oles et al. |
| 2008/0270163 A1 | 10/2008 | Green |
| 2008/0270298 A1 | 10/2008 | McElroy et al. |
| 2008/0270304 A1 | 10/2008 | Brown et al. |
| 2008/0281692 A1 | 11/2008 | Zhang et al. |
| 2008/0281734 A1 | 11/2008 | Longe et al. |
| 2008/0294977 A1 | 11/2008 | Friedman et al. |
| 2008/0301162 A1 | 12/2008 | Wall et al. |
| 2008/0314996 A1 | 12/2008 | Smith |
| 2008/0319868 A1 | 12/2008 | Briscoe et al. |
| 2009/0006203 A1 | 1/2009 | Fordyce, III et al. |
| 2009/0048923 A1 | 2/2009 | Seven et al. |
| 2009/0048963 A1 | 2/2009 | Bishop et al. |
| 2009/0061929 A1 | 3/2009 | Evans |
| 2009/0063297 A1 | 3/2009 | Dooley et al. |
| 2009/0063342 A1 | 3/2009 | Beckers |
| 2009/0063351 A1 | 3/2009 | Schmeyer et al. |
| 2009/0078757 A1 | 3/2009 | Hanson et al. |
| 2009/0089205 A1 | 4/2009 | Bayne |
| 2009/0094125 A1 | 4/2009 | Killian et al. |
| 2009/0099964 A1 | 4/2009 | Calderon-Gonzalez |
| 2009/0112761 A1 | 4/2009 | Robertson et al. |
| 2009/0134218 A1 | 5/2009 | Yuzon et al. |
| 2009/0138396 A1 | 5/2009 | Boal |
| 2009/0157220 A1 | 6/2009 | Walker et al. |
| 2009/0164351 A1 | 6/2009 | Sorbe et al. |
| 2009/0164362 A1 | 6/2009 | Moore |
| 2009/0164363 A1 | 6/2009 | Ahlers et al. |
| 2009/0171775 A1 | 7/2009 | Cashion et al. |
| 2009/0192934 A1 | 7/2009 | Chu et al. |
| 2009/0222367 A1 | 9/2009 | Jenkins et al. |
| 2009/0228307 A1 | 9/2009 | Sorbe |
| 2009/0254431 A1 | 10/2009 | Crowe et al. |
| 2009/0254484 A1 | 10/2009 | Forero et al. |
| 2009/0265241 A1 | 10/2009 | Bishop et al. |

(56) References Cited

U.S. PATENT DOCUMENTS

| | | |
|---|---|---|
| 2010/0012721 A1 | 1/2010 | Jain et al. |
| 2010/0017278 A1 | 1/2010 | Wilen et al. |
| 2010/0030687 A1 | 2/2010 | Panthaki et al. |
| 2010/0057554 A1 | 3/2010 | Lanford |
| 2010/0057609 A1 | 3/2010 | Sibson |
| 2010/0076836 A1 | 3/2010 | Giordano et al. |
| 2010/0076875 A1 | 3/2010 | Ernst et al. |
| 2010/0106555 A1 | 4/2010 | Mneimneh et al. |
| 2010/0114743 A1 | 5/2010 | Misraje et al. |
| 2010/0123006 A1 | 5/2010 | Chen |
| 2010/0153273 A1 | 6/2010 | Sellars et al. |
| 2010/0174584 A1 | 7/2010 | Tiezten et al. |
| 2010/0222132 A1 | 9/2010 | Sanford et al. |
| 2010/0280921 A1 | 11/2010 | Stone et al. |
| 2010/0280949 A1 | 11/2010 | Van Rensburg |
| 2010/0306104 A1 | 12/2010 | Johnson |
| 2010/0312684 A1 | 12/2010 | Kemper et al. |
| 2011/0047039 A1 | 2/2011 | Crames et al. |
| 2011/0054981 A1 | 3/2011 | Faith et al. |
| 2011/0082737 A1 | 4/2011 | Crowe et al. |
| 2011/0093323 A1 | 4/2011 | Prus et al. |
| 2011/0106698 A1 | 5/2011 | Isaacson et al. |
| 2011/0112956 A1 | 5/2011 | Ling et al. |
| 2011/0112957 A1 | 5/2011 | Ingram et al. |
| 2011/0124390 A1 | 5/2011 | Wilen |
| 2011/0153462 A1 | 6/2011 | Granich |
| 2011/0270664 A1 | 11/2011 | Jones |
| 2011/0282784 A1 | 11/2011 | Nelsen |
| 2012/0047003 A1 | 2/2012 | Hammad et al. |
| 2012/0095820 A1 | 4/2012 | Chandrasekaram et al. |
| 2012/0123827 A1 | 5/2012 | Dooley et al. |
| 2012/0271697 A1 | 10/2012 | Gilman et al. |
| 2012/0271733 A1 | 10/2012 | Brooks |
| 2013/0124277 A1 | 5/2013 | Dooley et al. |
| 2013/0124429 A1 | 5/2013 | Zou et al. |
| 2013/0132169 A1 | 5/2013 | Dooley et al. |
| 2013/0159184 A1 | 6/2013 | Thaw |
| 2013/0173407 A1 | 7/2013 | Killian et al. |
| 2013/0246220 A1 | 9/2013 | Hammad et al. |
| 2013/0297431 A1 | 11/2013 | Deubell et al. |
| 2013/0304642 A1 | 11/2013 | Campos |
| 2014/0032381 A1 | 1/2014 | Killian et al. |
| 2014/0076978 A1 | 3/2014 | Smith et al. |
| 2014/0108125 A1 | 4/2014 | Maraz et al. |
| 2014/0122327 A1 | 5/2014 | Aleles et al. |
| 2014/0172596 A1 | 6/2014 | Ten Cate |
| 2015/0120418 A1 | 4/2015 | Cervenka et al. |
| 2015/0220958 A1 | 8/2015 | Tietzen et al. |
| 2015/0278801 A1 | 10/2015 | Friedlander |
| 2016/0125698 A1 | 5/2016 | Dewaal |
| 2016/0203473 A1 | 7/2016 | Curtis |
| 2016/0317619 A1 | 11/2016 | Frey |
| 2017/0124586 A1 | 5/2017 | Tepper et al. |

FOREIGN PATENT DOCUMENTS

| | | |
|---|---|---|
| EP | 0348932 A2 | 5/1995 |
| JP | 2238593 A | 9/1990 |
| JP | 2278495 A | 11/1990 |
| JP | 3100791 A | 4/1991 |
| JP | 4165588 A | 6/1992 |
| KR | 20100010217 A | 2/2010 |
| WO | 198602757 A1 | 5/1986 |
| WO | 198607647 A1 | 12/1986 |
| WO | 198803297 A1 | 5/1988 |
| WO | 198908899 A1 | 9/1989 |
| WO | 199109370 A1 | 6/1991 |
| WO | 199309515 A1 | 5/1993 |
| WO | 199410649 A1 | 5/1994 |
| WO | 199428498 A1 | 12/1994 |
| WO | 199503570 A2 | 2/1995 |
| WO | 199746986 A1 | 12/1997 |
| WO | 200060487 A1 | 10/2000 |
| WO | 2007133315 A2 | 11/2007 |
| WO | 2008102329 A2 | 8/2008 |
| ZA | 200709282 | 10/2007 |

OTHER PUBLICATIONS

Final Office Action for co-pending U.S. Appl. No. 12/389,749 dated Dec. 11, 2014.
Health Savings Account (HSA): Horizon Blue Cross Blue Shield of New Jersey, Small Employer Guide, Jan. 2006, 18 pages.
Kent FOC Newsletter, retrieved at www.accesskent.com/Courts/FOC/pdfs/newsletter/022006.pdf, Feb. 2006, 1 page.
Office Action for co-pending U.S. Appl. No. 12/397,113 dated Nov. 3, 2014.
Office Action for co-pending U.S. Appl. No. 12/626,349 dated Dec. 12, 2014.
Office Action for co-pending U.S. Appl. No. 12/731,852 dated Nov. 10, 2014.
Office Action for co-pending U.S. Appl. No. 12/892,847 dated Nov. 5, 2014.
Office Action for co-pending U.S. Appl. No. 13/036,076 dated Jan. 29, 2015.
Office Action for co-pending U.S. Appl. No. 13/232,700 dated Jan. 29, 2015.
Office Action for co-pending U.S. Appl. No. 13/287,725 dated Sep. 26, 2013.
Office Action for co-pending U.S. Appl. No. 13/450,617 dated Oct. 28, 2014.
Office Action for co-pending U.S. Appl. No. 13/782,550 dated Dec. 17, 2014.
Office Action for co-pending U.S. Appl. No. 14/071,386 dated Dec. 16, 2014.
Final Office Action for co-pending U.S. Appl. No. 12/892,847 dated Aug. 12, 2014.
Hori et al. "Did the Shopping Coupon Program Stimulate Consumption? Evidence from Japanese Micro Data" ESRI Discussion Paper Series No. 12, Apr. 2002, 45 pages.
Office Action for co-pending U.S. Appl. No. 12/367,187 dated Sep. 24, 2014.
Office Action for co-pending U.S. Appl. No. 12/389,749 dated Oct. 3, 2014.
Office Action for co-pending U.S. Appl. No. 13/287,725 dated Aug. 25, 2014.
Office Action for co-pending U.S. Appl. No. 13/349,290 dated Oct. 22, 2014.
Office Action for co-pending U.S. Appl. No. 13/450,617 dated May 12, 2014.
Office Action for co-pending U.S. Appl. No. 13/782,550 dated Sep. 12, 2014.
Office Action for co-pending U.S. Appl. No. 13/863,578 dated Sep. 30, 2014.
Bruene "Expensify Launches Decoupled Credit/Debit Card Using Prepaid Model" retrieved at www.netbanker.com/2008/09/expensify_launches-decoupled_credit_debit_card-using_prepaid_model.html, Sep. 11, 2008, 3 pages.
Business Debit Card Agreements; 3 pages; May 2004.
FDIC, FDIC Law, Regulations, Related Acts—consumer Protection by FDIC; 10 pages. Oct. 2005.
Film Financing Models: Rewards Against All Odds Are Varied, Video Age International, vol. 31, No. 5, Oct. 2011, 3 pages.
A CBO Study; "Emerging Electronic Methods for Making Payments" The Congress of the United States Congressional Budget Office, Jun. 1996; pp. 1-66.
Anonymous; "99Bill Launches Installment Credit Services" PR Newswire. New York: Aug. 21, 2008, retrieved Jul. 9, 2012 from ProQuest; pp. 1-2.
Anonymous; "Debit Goes to Dinner" Credit Card Management, New York: Oct. 1994, vol. 7, Iss. 7; p. 20, pp. 1-2.
Anonymous; "MasterCard Electronic prepaid" The Nilson Report, Los Angeles: Oct. 2003. Iss. 798; pp. 1-3.

(56) References Cited

OTHER PUBLICATIONS

ATM & Debit News; "Check Cashers Move Into Cards, Accounts" vol. 6, No. 24, Apr. 20, 2006, available from Business Source Complete, Ipswich, MA; pp. 1-3.
Avoid Gift Card Pitfalls, ConsumerReports.org, 2004-2009; pp. 1-2.
Bank of Boulder POS Debit Solution at the Table Now in Beta; First Bank to Certify IVI Spirit C2000 on MAPP (R), Business Wire, Aug. 3, 1994; p. 1.
Barnes, David B.; "VeriFone Introduces Everest (TM) Customer Activated Payment System to Multi-lane Retail Market" PR Newswire, New York: Feb. 20, 1995. Sec. 1 p. 1; pp. TRU000609-TRU000610.
Blair, Christine et al., "Challenges to the Dual Banking System: The Funding of Bank Supervision" FDIC Banking Review, Mar. 31, 2006; pp. 1-25.
Brown, Suzanne; "Goodnight Amy, Meg, Beth and Jo" LexisNexis, Rocky Mountain News, Dec. 8, 1994; p. 1.
Caskey, John P. et al.; "Is the Debit Card Revolution Finally Here?" Federal Reserve Bank of Kansas City, Economic Review; Fourth Quarter 1994; vol. 79 #4; pp. 79-95.
International Search Report, PCT/US2009/43988 dated Jul. 14, 2009; pp. 1-2.
Intralinks, Inc. Begins European Rollout of Its Proven Electronic Solution for Loan Syndication, London (Business Wire), Oct. 8, 1997, pp. 1-3.
Jones, Tim; "Paradigms lost" RSA Journal, Oct. 2006, pp. 28-31.
Klein, Robert J.; "Here Comes the Debit Card" Dun and Bradstreet, Inc. D&B Reports, Jul./Aug. 1990; 38, 4; pp. 1-2.
Krino, Gary et al.; "Shopping Notebook; A birthday card that pays off" Orange County Register, Jul. 19, 1996; pp. TRU005327-TRU005328.
Lazarus, David; "120% rate for Wells' Advances" San Francisco Chronicle, Oct. 6, 2004 p. C1; pp. 1-6.
Letter of Credit Explained: What is Letter of Credit?; available as of Sep. 2, 2011 at: http://www.loanuniverse.com/letters.html; pp. 1-2.
Mangu-Ward, Katherine; "Payday of Reckoning" Reason, 41(5), Oct. 2009, Research Library; pp. 40-47.
Mannix, Margaret; "Checkout Tech" U.S. News and World Report, Feb. 27, 1995; pp. 1-3.
MicroTrax Electronic Payment Systems: The MicroTrax Pinstripe Lane Equipment Users Guide, MicroTrax Ltd., Newport Beach, CA, 1991; pp. TRU007080-TRU007133.
MicroTrax Ltd. Omni 490M (and 490ML) Operation Manual for Integrated and Non-Integrated Configurations, 1994; pp. TRU007020-TRU007079.
MicroTrax Ltd., PC Electronic Payment Systems Reference Manual; 1995; pp. 1-381.
Miller, Joan; "VIPGift Receives Investment From Summit Partners and Bridgescale Partners" LexisNexis, Chattanooga, TN and Palo Alto, CA, Nov. 1, 2008; pp. 1-2.
NCR 4430-5000 MSR/PIN User's Guide, Order No. BSTO-2125-35, 1994; pp. TRU004428-TRU004692.
Neiman Marcus Express Card Advertisement, The New Yorker, Dec. 12, 1994; pp. 1-3.
Neiman Marcus to Launch NM Express Automated Gift Card, LexisNexis, PR Newswire, Nov. 22, 1994; p. 1.
Nieman Marcus Offers Electronic Gift Certificate, LexisNexis, Thomson Media Card Fax, Jan. 23, 1995; p. 1.
Non-Final Office Action for co-pending U.S. Appl. No. 12/367,187 dated Aug. 1, 2013; pp. 1-18.
Non-Final Office Action for co-pending U.S. Appl. No. 12/397,113 dated Oct. 15, 2013; pp. 1-10.
Non-Final Office Action for co-pending U.S. Appl. No. 12/626,349 dated Nov. 27, 2013; pp. 1-11.
Non-Final Office Action for co-pending U.S. Appl. No. 13/287,725 dated Jan. 17, 2014; pp. 1-47.
Notice of Allowance for co-pending U.S. Appl. No. 12/417,162 dated Oct. 1, 2012; pp. 1-10.

O'Keefe, Michele; "Portable POS Debit Terminal Mean Greater Convenience" Bank Systems & Technology, Nov. 1994; 31,11; pp. 35-37.
One Company's Diversification Shakes Up Peripherals Market, Chain Store Age, Jun. 1996; pp. TRU000628-TRU000630.
Orszag, Peter, "Unemployment Insurance as an Economic Stimulus" Center for Budget and Policy Priorities, Nov. 15, 2011; pp. 1-2.
Parrott, James; "Jittery Wall Street, Calm City?" Gotham Gazette, Apr. 16, 2007; pp. 1-5.
Pearlstine, Jane Boon; "Lenders, Borrowers Hook Up Over the Web: Prosper.com and Other Sites Provide Forum for Individual Bidders Willing to Offer Small Loans" Wall Street Journal, May 20, 2006; pp. 1-3.
Peppard, Alan; "Down and Dirty in Deep Ellum" LexisNexis, The Dallas Morning News, Dec. 3, 1994; pp. 1-2.
POS Terminal Can Handle Direct Debits, ABA Banking Journal, Sep. 1984; pp. TRU000623-TRU000624.
Powell, Robert L.; "Statewide Electronic Commerce Program Status Report" State of North Carolina Office of the State Controller, Mar. 7, 2007; pp. 1-32.
Prosper; "FDIC Advisory Committee on Economic Inclusion" Mar. 28, 2007; pp. 1-156.
Pyatt, Jr., Rudolph A.; "Mobil Stations to Permit Use of Bank Cards" The Washington Post, Oct. 25, 1983; p. 1.
Q Comm Expands Calling Card Products with Best Telecom Point-of-Sale Activated Cards; All Q Comm VeriFone Merchants Can Now Deliver Durable Calling Cards; Business Wire. New York: Dec. 6, 2005; pp. 1-2.
Racal Corp. Advertisement, POS Terminal Eliminates Credit Card Vouchers, ABA Banking Journal, Nov. 1985; pp. 81-82.
Rumiany, Diego; "Internet Bidding for Microcredit: making it work in the developed world, conceiving it for the developing world" ICT for Development dgCommunity, Mar. 2007; pp. 1-8.
Scott, Amanda et al.; "The web we weave" Financial World, Nov. 2006, pp. 12-15.
Service Mark Registration No. 1,981,044 for "NM Express Card" registered Jun. 18, 1996; p. 1.
Szabo, Joan C.; "The Changing World of Financial Services" Nation's Business, Oct. 1994; 82, 10; pp. 22-29.
VeriFone Everest Advertisement, Stores, May 1995; pp. TRU000631-TRU000632.
VeriFone Everest Reference Manual, VeriFone Part No. 25399, Revision A, Manual Revision 1.0, Jul. 1995; pp. 1-66.
VeriFone Folio (TM) Brings Credit and Debit Card Payment to the Restaurant Table, PR Newswire, May 16, 1994; pp. TRU000618-TRU000620.
VeriFone Introduces Pinpad (TM) 1000 to Point-of-Sale Debit Market, M2 Presswire, Apr. 21, 1995; p. TRU000625.
VeriFone OMNI 480/490 Programmer's Guide, VeriFone Part No. 12924—Revision A, Manual Revision 1.0, Oct. 1993; pp. TRU006420-TRU006647.
VeriFone TCL Terminal Control Language Programmer's Manual, VeriFone Part No. 00368-01, Revision G, Manual Revision 8.0, Aug. 1992; pp. TRU005667-TRU006028.
VeriFone TRANZ 330 Reference Manual, Verifone Part No. 00483—Revision D, Manual Revision 3.01, Apr. 1990; pp. TRU000242-TRU000379.
Wolf, Alan Steven; "The Missing Assignment Delimma" Servicing Management—Feb. 1997, pp. 1-3.
Wolf, File History of US 2005/0278347; pp. 1-115.
Wolfe, Daniel; "An E-Variation on Payday Loan Theme" American Banker, Jul. 28, 2005; pp. 1-3.
Zandi, Mark; "Washington Throws the Economy a Rope" Moody's Analytics | Dismal Scientist, Economy.com, Jan. 22, 2008; pp. 1-6.
Zubko, Nick; "An Automatic Connection Electronic Transaction Tools Help Manufacturers Connect With Suppliers to Streamline Sourcing Efforts" Industry Week, vol. 257, No. 7, Jul. 2008; pp. 26-27.
Castaneda, Laura; "Business Promote Services to Customers Day In and Day Out" LexisNexis, The Dallas Morning News, Nov. 26, 1994; pp. 1-3.
Coady, David et al.; "Targeted anti-poverty interventions: A selected annotated bibliography" World Bank, Jul. 2003; pp. 1-133.

(56) References Cited

OTHER PUBLICATIONS

Cohen, Bruce; "Alternative to Cash Gains Ground" The Financial Post (Toronto, Canada), Apr. 22, 1994; pp. TRU000616-TRU000617.
Coleman, Richard W.; "Is the Future of the Microfinance Movement to be Found on the Internet?" International Trade and Finance Association Working Papers 2007; pp. 1-12.
Credit Terminals to be Used at Canadian Liquor Outlets, Card News, Potomac: Jan. 23, 1995; p. 1.
Cross, Sam Y.; "All About . . . the Foreign Exchange Market in the United States" Federal Reserve Bank of New York, 1998; pp. 1-125.
Debit Card Popularity on the Rise, Chain Store Age Executive, Jan. 1994; p. 1.
Developing Asia and the World, Asian Development Outlook 2002; pp. 1-20.
Downes, Samantha; "How to avoid exchange charges WASTING MONEY a foreign currency bank account could be the answer" The Daily Telegraph, London (UK), Mar. 10, 2007; pp. 1-3.
E-finance and Small and Medium-Size Enterprises (SMEs) in Developing and Transition Economies, United Nations Conference on Trade and Development, UNCTAD Expert Meeting, Oct. 22-24, 2001; pp. 1-41.
EverBank's World Currency CDs—My Interview with EverBank's Executive Frank Trotter; Bank Deals—Best Rates and Deals, http://bankdeals.blogspot.com, Jul. 29, 2007; pp. 1-9.
Express Cards and Trains, LexisNexis, Chain Store Age Executive Edition, Jan. 1995; p. 1.
Final Office Action for co-pending U.S. Appl. No. 12/338,584 dated Sep. 15, 2011; pp. 1-15.
Final Office Action for co-pending U.S. Appl. No. 12/338,684 dated Sep. 23, 2011; pp. 1-14.
Final Office Action for co-pending U.S. Appl. No. 12/367,187 dated Feb. 12, 2014; pp. 1-22.
Final Office Action for co-pending U.S. Appl. No. 12/389,749 dated Mar. 29, 2012; pp. 1-38.
Final Office Action for co-pending U.S. Appl. No. 12/731,852 dated Apr. 5, 2012; pp. 1-32.
Final Office Action for co-pending U.S. Appl. No. 12/877,524 dated Jun. 8, 2012; pp. 1-26.
Final Office Action for co-pending U.S. Appl. No. 12/889,281 dated Apr. 8, 2013; pp. 1-20.
Final Office Action for co-pending U.S. Appl. No. 12/892,847 dated Mar. 29, 2013; pp. 1-20.
Final Office Action for co-pending U.S. Appl. No. 13/036,076 dated Apr. 8, 2013; pp. 1-11.
Final Office Action for co-pending U.S. Appl. No. 13/214,126 dated Aug. 1, 2013; pp. 1-19.
Final Office Action for co-pending U.S. Appl. No. 13/232,700 dated Oct. 12, 2012; pp. 1-20.
Final Office Action for co-pending U.S. Appl. No. 13/349,290 dated Mar. 14, 2013; pp. 1-14.
Financial Advice Investment Money, HSBC Offshore Internet Banking, Oct. 1, 2009 at 5:50pm; pp. 1-3.
Financial Advice Investment Money, HSBC Offshore Internet Banking, Oct. 1, 2009 at 7:25am; pp. 1-2.
Flannery, Matt; "Kiva and the Birth of Person-to-Person Microfinance" Innovations, Winter & Spring 2007; pp. 31-56.

Foreign Exchange Market, Wikipedia, available as of Jan. 27, 2009 at: http://en.wikipedia.org/wiki/Foreign_exchange_market; pp. 1-13.
Fox, Linda A.; "Keep an Eye on Your Credit Card" The Toronto Sun, Aug. 9, 1996; p. 1.
Garriss, J. (2004); "Forging an ideal HSA" Workspan, 47(5), 18-25, Retrieved Sep. 3, 2013 from http://search.proquest.com/docview/194709831?; pp. 1-6.
Heng, Stefan et al.; "Implications of Web 2.0 for financial institutions: Be a driver, not a passenger" Munich Personal RePEc Archive, Jul. 31, 2007; pp. 1-12.
Hill, Den; "Nieman Marcus Goes High-Tech for the Holidays" LexisNexis, ADWEEK, Dec. 5, 1994; p. 1.
Hulme Michael K et al.; "Internet Based Social Lending: Past, Present and Future" Social Futures Observatory, Oct. 2006; pp. 1-115.
Hypercom S7C Advertisement, Chain Store Age, Sep. 1995; pp. 1-4.
Hypercom S7SC Advertisement, Chain Store Age, Feb. 1996; pp. 1-2.
IBM 4680 General Sales Application Electronic Funds Transfer User's Guide, IBM Corp., Research Triangle Park, NC, Dec. 1990; pp. TRU000969-TRU001228.
IBM 4680 General Sales Application Electronic Funds Transfer User's Guide, IBM Corp., Research Triangle Park, NC, Mar. 1991; pp. TRU008280-TRU008542.
IBM 4680 General Sales Application: Guide to Operations, Research Triangle Park, NC, Jun. 1991; pp. TRU008543-TRU008964.
IBM 4680-4690 Advanced Payment System for Chain Drug Sales Application User's Guide, Nov. 1996; pp. TRU003787-TRU004044.
IBM 4680-4690 Advanced Payment System for General Sales Application User's Guide, Jul. 1996; pp. TRU003317-TRU003564.
IBM 4680-4690 Advanced Payment System for Supermarket Application User's Guide, Sep. 1996; pp. TRU003565-TRU003786.
IBM 4680-4690 Supermarket Application—Electronic Funds Transfer Feature Enhancement: User's Guide, IBM Corp., Research Triangle Park, NC, Sep. 1995; pp. TRU000651-TRU000968.
International Search Report, PCT/US09/56072, dated Oct. 20, 2009; pp. 1-3.
International Search Report, PCT/US2008/87689, dated Jun. 17, 2009; pp. 1-2.
International Search Report, PCT/US2009/34692, dated Apr. 14, 2009; pp. 1-2.
International Search Report, PCT/US2009/39492 dated May 14, 2009; pp. 1-2.
International Search Report, PCT/US2009/39495, dated May 18, 2009; pp. 1-2.
International Search Report, PCT/US2009/39504, dated May 27, 2009; pp. 1-2.
International Search Report, PCT/US2009/39512, dated Jun. 8, 2009; pp. 1-2.
International Search Report, PCT/US2009/43978, dated Jun. 30, 2009; pp. 1-2.
FinAid The SmartStudent Guide to Financial Aid "Zopa USA Peer to Peer Loans" available as of Aug. 13, 2019 at: http://www.finaid.org/loans/p2p-zopa.phtml; pp. 1-2.

\* cited by examiner

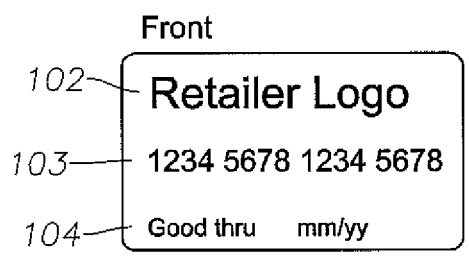
Fig. 1A
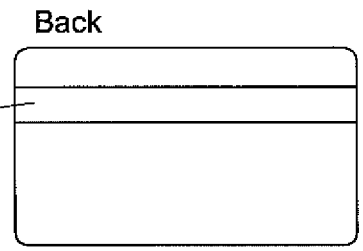
Fig. 1B
Fig. 2

```
HEADER|PAYEE FILE|11202007
ACCOUNT NUMBER|NAME|PAYMENT AMOUNT|PAYMENT DATE
20000000000003|JOHNSON, TIM|40.00
20000000000013|WILSON, GREG|60.00
20000000000006|MCDONALD, GEORGE|20.00
20000000000034|JONES, STELLA|20.00
20000000000002|SMITH, JANE|40.00
20000000000007|JONES, JOE|20.00
20000000000009|WATSON, KAREN|60.00
20000000000015|MONTGOMERY, MIKE|40.00
20000000000018|OLSON, RON|20.00
20000000000019|SAMUELSON, JULIE|40.00
TRAILER|10
```
← 32

Fig. 8

Incoming ACH File

```
101 073972181 273970116071120044A094101GALILEO                 Meta Payment Systems
5200ABC COMPANY                         1234567890PPDABCCOMPANY071120071120324102100002000001716
6220739721812000000000000001    000002385311111111 DOE, JOHN              002100002045346200
6220739721812000000000000002    000004156022222222 SMITH, JANE            002100002045351100
6220739721812000000000000003    000004263333333333 JOHNSON, TIM           002100002045381100
6220739721812000000000000004    000000897244444444 ROBINSON, MIKE         002100002045419000
6220739721812000000000000005    000004233155555555 WILSON, DAVE           002100002045424700
6220739721812000000000000006    000002940566666666 MCDONALD, GEORGE       002100002045436200
6220739721812000000000000007    000003856577777777 JONES, JOE             002100002045446500
6220739721812000000000000008    000004017188888888 SAMUELSON, SAM         002100002045486900
6220739721812000000000000009    000004732799999999 WATSON, KAREN          002100002045525900
6220739721812000000000000010    000003660210101010 WHITE, FRANK           002100002045535700
82000000100000739721800000000000351422                                    021000002000001716
90000001000002000000010000739721800000000000351422
9999999999999999999999999999999999999999999999999999999999999999999999999999999999999999999999
9999999999999999999999999999999999999999999999999999999999999999999999999999999999999999999999
9999999999999999999999999999999999999999999999999999999999999999999999999999999999999999999999
```

100 ⟵                                                                                    ⟵ 32

Fig. 9
Outgoing ACH File

```
101 0739721812739701160711200440A094101GALILEO         Meta Payment Systems
5200ABC COMPANY                 1234567890PPDABCCOMPANY07112007112003241021000020000171
622073972181200000000000000001          000023853111111111DOE, JOHN          00210000020453462
622073972181200000000000000002          000041560222222222SMITH, JANE        00210000020453511
622073972181200000000000000003          000042636333333333JOHNSON, TIM       00210000020453811
622073972181200000000000000004          000089724444444444ROBINSON, MIKE     00210000020454190
622073972181200000000000000005          000042315555555555WILSON, DAVE       00210000020454247
622073972181200000000000000006          000029406666666666MCDONALD, GEORGE   00210000020454362
622073972181200000000000000007          000038657777777777JONES, JOE         00210000020454465
622073972181200000000000000008          000040171888888888SAMUELSON, SAM     00210000020454869
622073972181200000000000000009          000047327999999999WATSON, KAREN      00210000020455259
622073972181200000000000000010          000036602101010101WHITE, FRANK       00210000020455357
82000000001000739721812000000000000000000351422123456789                     02100000020000171
5200LOAN COMPANY                9876543210CCDLOANPAYMNT07112007112003241021000020000171
627073972181200000000000000002          000040002222222222SMITH, JANE        00222222222222221
627073972181200000000000000003          000040003333333333JOHNSON, TIM       00222222222222222
627073972181200000000000000006          000020006666666666MCDONALD, GEORGE   00222222222222223
627073972181200000000000000007          000020007777777777JONES, JOE         00222222222222224
627073972181200000000000000009          000060009999999999WATSON, KAREN      00222222222222225
820000000500036986090000000000001800000000987654321                          02100000020000171
9000000020000030000000000015011095827000000000000351422
9999999999999999999999999999999999999999999999999999999999999999999999999999999999999999
9999999999999999999999999999999999999999999999999999999999999999999999999999999999999999
9999999999999999999999999999999999999999999999999999999999999999999999999999999999999999
```

100 ← (left)  42 → (right)

Fig. 10    Outgoing ACH File

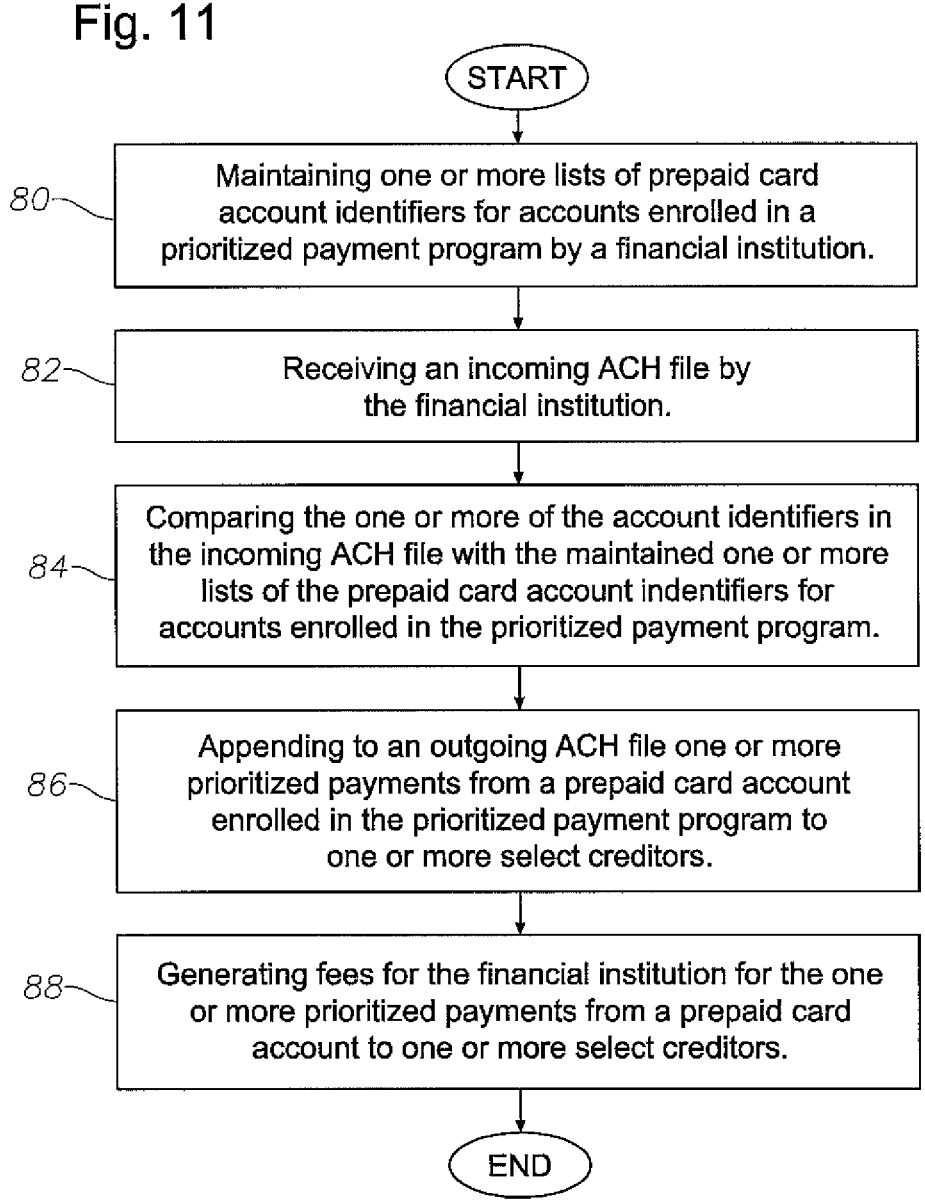

US 10,706,397 B2

TRANSFER ACCOUNT MACHINE, NON-TRANSITORY COMPUTER MEDIUM HAVING COMPUTER PROGRAM, AND ASSOCIATED COMPUTER-IMPLEMENTED METHOD

RELATED APPLICATIONS

This application is a continuation of and claims the benefit and priority to U.S. patent application Ser. No. 12/338,584 titled "Transfer Account Systems, Computer Program Products, And Associated Computer-Implemented Methods" filed on Dec. 18, 2008, which claims priority to and the benefit of U.S. Provisional Patent Application Ser. No. 61/016,213, by Sorbe et al., titled "Transfer Account Systems, Computer Program Products, and Associated Methods" filed Dec. 21, 2007, and U.S. Provisional Patent Application Ser. No. 61/052,454, by Sorbe et al., titled "Transfer Account Systems, Computer Program Products, and Methods to Prioritize Payments from Preselected Bank Account" filed May 12, 2008, all of which are each incorporated herein by reference in their entireties. This application also relates to U.S. patent application Ser. No. 12/338,402, by Sorbe et al., titled "Transfer Account Systems, Computer Program Products, and Associated Computer-Implemented Methods" filed on Dec. 18, 2008; U.S. patent application Ser. No. 12/338,440, by Sorbe et al., titled "Transfer Account Systems, Computer Program Products, and Associated Computer-Implemented Methods" filed on Dec. 18, 2008; U.S. patent application Ser. No. 12/338,645, by Sorbe et al., titled "Transfer Account Systems, Computer Program Products, and Computer-Implemented Methods to Prioritize Payments from Preselected Bank Account" filed on Dec. 18, 2008; and U.S. application Ser. No. 12/389,749 filed on Feb. 29, 2009 titled "Methods to Advance Loan Proceeds On Prepaid Cards, Associated Systems and Computer Program Products, which claims priority and benefit to U.S. Provisional Patent Application Ser. No. 61/029,975 filed on Feb. 20, 2008 titled the same, each and all of which are incorporated herein by reference in their entireties.

This application is also a continuation of and claims the benefit and priority to U.S. patent application Ser. No. 13/782,550 titled "Transfer Account Systems, Computer Program Products, And Associated Computer-Implemented Methods" filed Mar. 1, 2013, which claims priority to U.S. patent application Ser. No. 13/282,186, now U.S. Pat. No. 8,392,299, titled "Transfer Account Systems, Computer Program Products, And Associated Computer-Implemented Methods" filed Oct. 26, 2011, which claims priority to and the benefit of U.S. patent application Ser. No. 12/338,365, now U.S. Pat. No. 8,055,557, titled "Transfer Account Systems, Computer Program Products, and Associated Computer-Implemented Methods" filed on Dec. 18, 2008, which claims priority to and the benefit of U.S. Provisional Patent Application Ser. No. 61/016,213, by Sorbe et al., titled "Transfer Account Systems, Computer Program Products, and Associated Methods" filed Dec. 21, 2007, all of which are each incorporated herein by reference in their entireties.

FIELD OF INVENTION

The present invention relates generally to the financial service and banking industries, and, more particularly, to systems, computer program products, and associated computer-implemented methods of providing prioritized payments from proceeds of automatic deposits.

BACKGROUND

Today, a bank customer can authorize a loan provider to debit a customer's bank account, e.g., a checking, savings, money market, for a loan payment, or, more generally, a customer can authorize a creditor to debit the customer's bank account for a bill payment. Funds, however, may or may not be in the account at the time the creditor is authorized to debit the account or receive the funds from the account. Furthermore, the bank authorized to make the debit controls the order of presentment. This allows covering of an overdraft to the bank itself first or processing larger items early in the day in order to generate more overdraft fees when multiple smaller items are processed later in the day. Rather than bounce one big check, for example, banks may choose to bounce several smaller checks to generate extra fees.

It is known for banks to offer money management systems that have a money management account and a discretionary fund account in which bills are paid directly from the money management account on a customer-determined schedule, and excess funds beyond the customer's budget are transferred into the discretionary fund account. It is also known that such a money management system can be used in conjunction with loan payments. These offerings, however, still require the customer to determine a budget and schedule of payments. In addition, these offerings depend on the customer's discipline for not accessing the funds in the money management account, funds which are known to the customer and belong to the customer.

Other systems or methods include having an employer make loan payments on behalf of an employee directly out of payroll. Such solutions needlessly involve the employer in the finances of the employee, which can raise privacy concerns and introduce complexity into the payroll process.

Direct deposit proceeds, as the name implies, are often directly deposited into a bank customer's deposit account, also known as a checking account, savings account, or bank account. That is, a direct deposit is a payment that is electronically deposited into an individual's account at a depository institution. A direct deposit can be more generally known as an automatic deposit. Partially as a result of the situation with funds not being available to authorized creditors, among other reasons, many people simply do not have a traditional checking, savings, or other deposit account; they do not write checks. Instead, their automatic deposit proceeds, such as payroll and government benefits, typically are deposited into prepaid card accounts. Often these customers limit payments to available funds on a prepaid card.

SUMMARY OF INVENTION

Applicants have recognized numerous problems with current offerings for loan and other bill payments and one or more sources of these problems. For example, Applicants have recognized that it can be difficult for a creditor to be assured of payment for an authorized debit using a traditional bank account unless a customer is willing and able to balance or manage the deposit account, recording each and every deposit, check, Automated Teller Machine (ATM) withdrawal, and debit card transaction, including automatic withdrawals and bank fees. Also, from a customer's point of view, there is a need to be able to prioritize loan payments or other bill payments without having to balance a check book. That is, a customer may like, for example, to have his car payment debited from the proceeds of his payroll check immediately, rather than ever having access to the funds. Prioritized loan and bill payment can improve the customer's payment history and, thus, improve the customer's credit rating or credit score to thereby result in lower interest rates for the customer on any future loan. From a loan provider's perspective, there is great value in being able to prioritize loan payments. By reducing the risk of non-payment, in many cases substantially so, the loan provider should be able to offer more affordable loan products, benefiting both the loan provider and also loan customers. Payment prioritization, according to embodiments of the present invention, should reduce the risk of non-payment as compared to the risk that the source of the automatically deposited funds dries up (i.e., the worker's employment is terminated) or is redirected (i.e., the worker changes the automatic deposit routing).

In view of the foregoing, Applicants provide embodiments of transfer account systems, computer program product, and associated computer-implemented methods of providing prioritized payments from the proceeds of automatic deposits according to the present invention. According to embodiments of the present invention, for example, a transfer account acts as a new form of pass-through or sweep account, allowing automatic deposit funds to be intercepted and swept of prioritized loan or bill payments relatively instantaneously after the customer has access to the proceeds, resulting in the customer effectively having access only to any surplus funds, that is, the automatic deposits funds net of the prioritized payments.

According to embodiments of the present invention, various situations with recurring automatic deposit funds can benefit from a transfer account, including, for example, employer payroll funds to individuals, federal or state government electronic benefits payments to individuals, and bank-initiated payments to merchants for credit card sales. Recurring automatic deposit funds also include annuities, dividends, interest payments, lottery winnings, royalty payments, and other streams of payments as understood by those skilled in the art.

According to embodiments of the present invention, various types of payment on behalf of the customer can benefit from embodiments of the present invention, including, for example: (1) payments to a third-party (i.e., credit card, utility, cell phone bills) under a license agreement from the bank providing the transfer account; (2) a customer-initiated gift card purchase; (3) customer remittance of money to family located internationally or outside of a country; (4) loan payments to the bank providing the transfer account; (5) customer-initiated bill payment; (6) customer transfer of money to another transfer account customer, and others as understood by those skilled in the art. Note that, according to embodiments of the present invention, prioritized payments may be recurring or non-recurring events.

As understood by those skilled in the art, Automated Clearing House (ACH) is the name of an electronic network for financial transactions in the United States, regulated by the Federal Reserve. Embodiments of the present invention, for example, use standard ACH payments to receive the automatic deposit funds and to send the automatic deposit funds and prioritized payment information to another financial institution or prepaid card processor.

Embodiments of the present invention include a computer-implemented method of providing prioritized payments. Under the computer-implemented method, a financial institution enrolls customer accounts, whether prepaid card accounts or deposit accounts at another financial institution, in a prioritized payment program. As part of enrolling in the prioritized payment program, the customer pre-authorizes payment requests by one or more select creditors from the account. The financial institution computer maintains one or more lists of account identifiers for accounts enrolled in the program. Next, the financial institution computer receives an incoming ACH file, a batch file as understood by those skilled in the art, including one or more automatic deposits for an account enrolled in the prioritized payment program. The financial institution computer compares the account identifiers in the incoming ACH file with the maintained lists of enrolled account identifiers. For each account enrolled in the prioritized payment program with an unfilled pre-authorized payment request by a select creditor, the financial institution computer appends to an outgoing ACH file one or more prioritized payments responsive to the unfilled pre-authorized payment requests. The outgoing ACH file includes entries for the automatic deposit from the incoming ACH file and entries for the one or more prioritized payments, so that the automatic deposit is credited to the account and relatively instantaneously any prioritized payment to a select creditor is debited from the account, resulting in the customer effectively having access only to any surplus or net funds.

Embodiments of the present invention further include the generating of fees by the financial institution computer for the financial institution for the one or more prioritized payments from an account enrolled in the prioritized loan program to one or more select creditors when these prioritized payments are appended to the outgoing ACH file. Fees can be based per account, per transaction, per vendor, or otherwise as understood by those skilled in the art.

The embodiments of the present invention enable the offering of new products and promotions by requiring a customer to enroll in the prioritized payment program as a condition of a transaction. For example, a mobile phone provider's standard offer today, for example, can include a new phone for $100 upfront with a one-year service agreement at $75 per month. According to the embodiments of the present invention, a new offering can be a new phone for no upfront costs with one-year service agreement at $75 per month, with the agreement requiring the routing of payroll funds via automatic deposit to a transfer account and pre-authorization for the payment of the monthly bill. In this example, the mobile phone provider receives, as part of the service agreement, prioritized payment each month from the proceeds of the customer's automatic deposit.

In other embodiments of the present invention, a customer is required to enroll in the prioritized payment program as a condition of a loan. For example, a lending institution can offer a car loan to a customer having a low credit score and without a traditional deposit account if the customer will enroll in the prioritized payment program, including pre-authorizing loan payments to the lending institution and routing the customer's payroll deposit to a transfer account.

In yet another embodiment of the present invention, a bank can offer a merchant a discounted small business loan rate if the merchant will route the automatic deposit of the merchant's credit card receipts to a transfer account and allow that bank prioritized loan payments from the credit card receipts funds.

Embodiments of the present invention include computer program product to implement the methods described and shown. Embodiments of the present invention include a computer program product, stored on a tangible computer memory media that is readable by a computer, providing prioritized payments from the proceeds of automatic deposits, the computer program product comprising a set of instructions that, when executed by the computer, cause the computer to perform various operations. The operations include maintaining lists of account identifiers for accounts enrolled in a prioritized payment program by a financial institution, receiving an incoming ACH file by a financial institution, comparing the one or more of the account identifiers in the incoming ACH file with the maintained one or more lists of account identifiers for accounts enrolled in the prioritized payment program, and formulating one or more outgoing ACH files responsive to the incoming ACH file. In the event of a match between an account identifier on a list of accounts enrolled in the priority payment program and an account identifier in the incoming ACH file, the operations include appending to the outgoing ACH file one or more prioritized payments from an account enrolled in the prioritized payment program to one or more select creditors responsive to one or more unfilled pre-authorized payment requests by the one or more select creditors, so that the automatic deposit is credited to the account and relatively instantaneously any prioritized payment to the one or more select creditors is debited from the account. According to an embodiment of the present invention, the operations further include notifying a select creditor that the incoming ACH file includes one or more accounts enrolled in the prioritized payment program prompting a payment request by the select creditor.

In addition, embodiments of the present invention include systems, computer program products, and associated computer-implemented methods of providing prioritized payments for loan, bill, and other payments from the proceeds of automatic deposits as will be understood by those skilled in the art, so that a customer has effective access through the customer account or on a prepaid card only to a net value of funds.

BRIEF DESCRIPTION OF DRAWINGS

So that the manner in which the features and benefits of the invention, as well as others which will become apparent, may be understood in more detail, a more particular description of the invention briefly summarized above may be had by reference to embodiments thereof which are illustrated in the appended drawings, which form a part of this specification. It is also to be noted, however, that the drawings illustrate only various embodiments of the invention and are therefore not to be considered limiting of the invention's scope as it may include other effective embodiments as well.

FIGS. 1A and 1B are respective front and back plan views of a prepaid card as used according to an embodiment of the present invention;

FIG. 2 is a front plan view of a display screen of a computer displaying an excerpt of an account activity statement according to an embodiment of the present invention;

FIG. 8 is an excerpt of an incoming ACH file with automatic deposits entries stored in memory of a computer and capable of being displayed on a display screen of a computer according to an embodiment of the present invention;

FIG. 9 is an excerpt of an outgoing ACH file with automatic deposits and prioritized payment entries stored in memory of a computer and capable of being displayed on a display screen of a computer according to another embodiment of the present invention;

FIG. 10 is an excerpt of an outgoing ACH file with headings stored in memory of a computer and being displayed on a display screen of a computer according to another embodiment of the present invention;

FIG. 11 is a flow diagram of a computer-implemented method of prioritized payments according to an embodiment of the present invention;

DETAILED DESCRIPTION OF INVENTION

Figure 3:
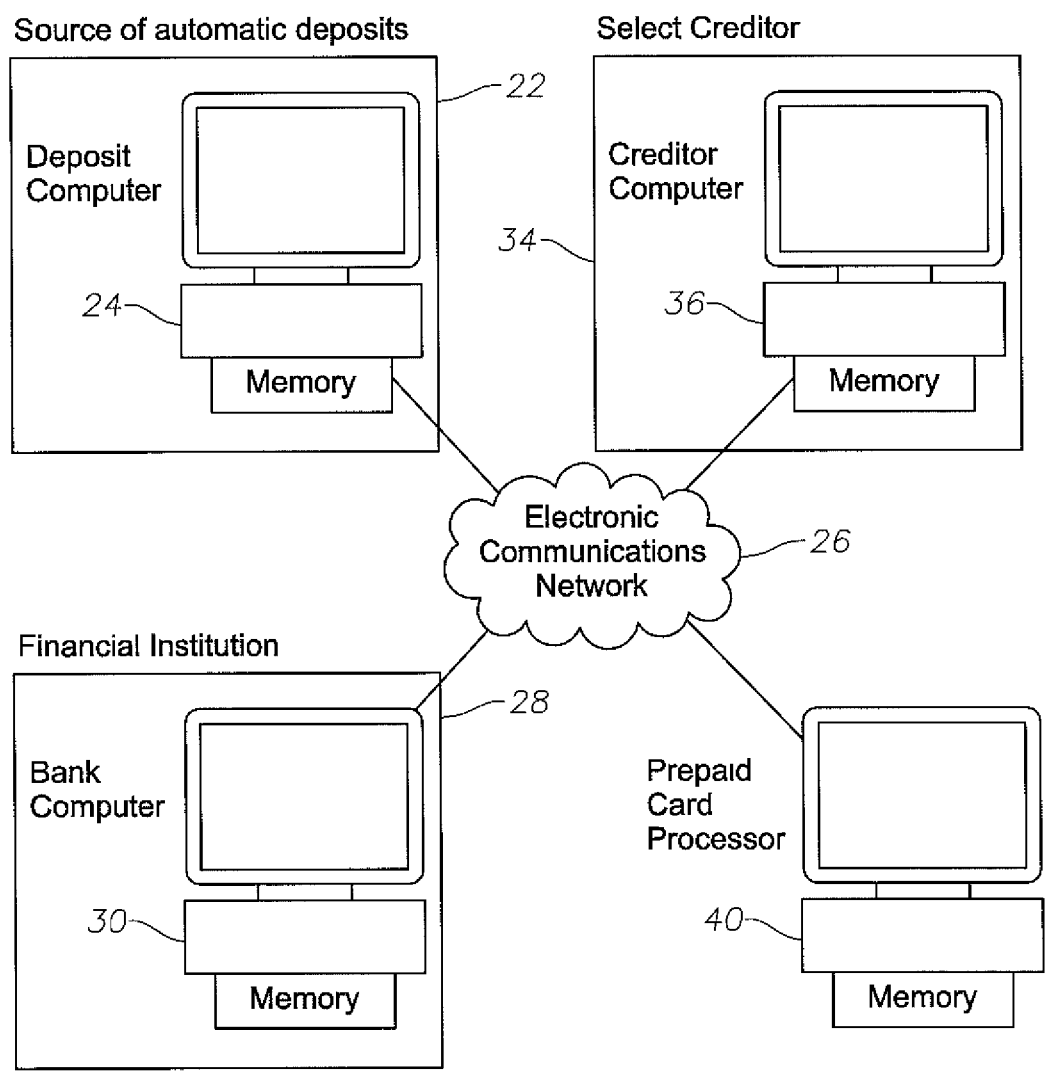
FIG. 3 is a schematic block diagram of a system to provide prioritized payments for a prepaid card account according to an embodiment of the present invention.

The present invention will now be described more fully hereinafter with reference to the accompanying drawings, which illustrate embodiments of the invention. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

One source of the problems with current offerings for loan and other bill payment, as recognized by Applicants, is that money that can be accessed is often spent. The adage about money burning a hole in the pocket is apt. Although a bank customer can authorize a loan provider to debit the customer's deposit account for a loan payment, or, more generally, a customer can authorize a creditor to debit the customer's deposit account for a bill payment, there is no guaranty that the funds will still be available at the time of the request for payment. That is, a creditor can debit the customer's account too late, or too early if new funds have not been deposited. Applicants recognize that a preferred time for a debit is immediately after or relatively simultaneous with the receipt of a deposit, especially a recurring deposit such as payroll or government benefits.

Embodiments of the present invention, as illustrated in FIGS. 1A and 1B, for example, can include a prepaid card 101. As understood by those skilled in the art, prepaid cards can include a logo 102 associated with a provider or sponsor of the prepaid card and an expiration date 104. Prepaid cards 101 are typically associated with an account number 103, and a prepaid card account can often be reloaded with additional funds. Prepaid cards 101 often have a magnetic strip 105, as understood by those skilled in the art, and are coded so that the code received by a point of sale terminal or other interface processes the code so that a value is associated with the code, for example, to allow purchases with the prepaid card through a communications network 26, as illustrated in FIG. 3, to authorize payment from a bank or other financial institution through a prepaid card processor 40, and to decrement the value associated with the card 101.

Embodiments of the present invention, as illustrated in FIG. 2, include a display screen of a computer displaying an excerpt of an account activity statement for a customer account 110. The account activity statement can include a list of activities or transactions, sorted by one or more of the time 111, description 112, credit 113 (or deposit or addition), debit 114 (or withdrawal or subtraction), or balance 115. The account activity can provide for various periods of time, including a day (as shown in FIG. 2), a week, a month, or otherwise as understood by those skilled in the art. For example, the overnight balance 116 can be provided. Then a credit, such as, for example, an automatic payroll deposit 117A, can be listed. Debits, including prioritized payments, such as, for example, for a car payment 117B and a cell phone bill 1170, can be listed. Other transactions, such as, a balance inquiry 118, an ATM withdrawal 119, an ATM fee 120, or other fees and transactions as understood by those skilled in the art, can be listed. According to embodiments of the present invention, the automatic deposit is credited to the account and relatively instantaneously any prioritized payment to the one or more select creditors is debited from the account (as illustrated in the time column 111 for transactions 117A, 117B, and 117C) so that the customer effectively has access to only the surplus funds.

Figure 4:
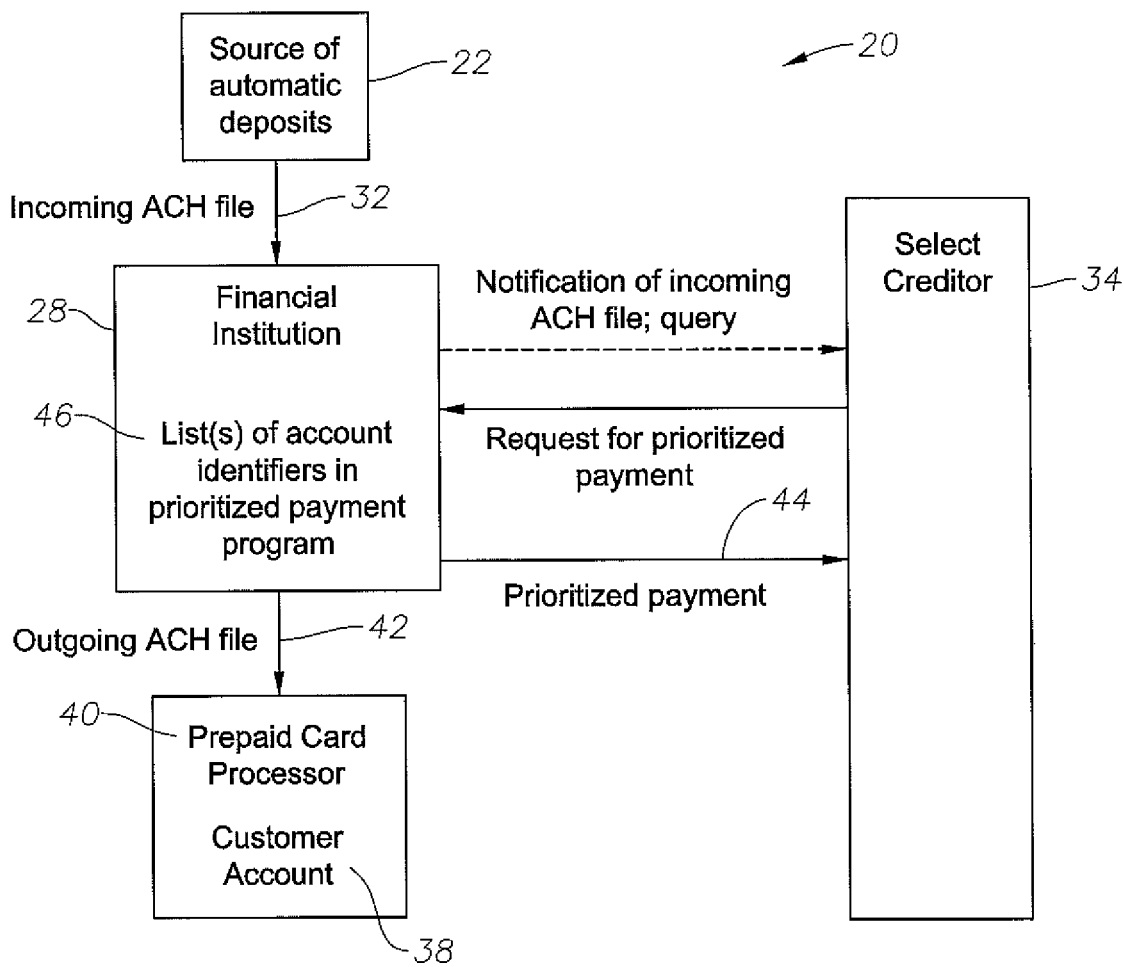
FIG. 4 is a schematic flow diagram of a system to provide prioritized payments for a prepaid card account according to another embodiment of the present invention.
Figure 5:
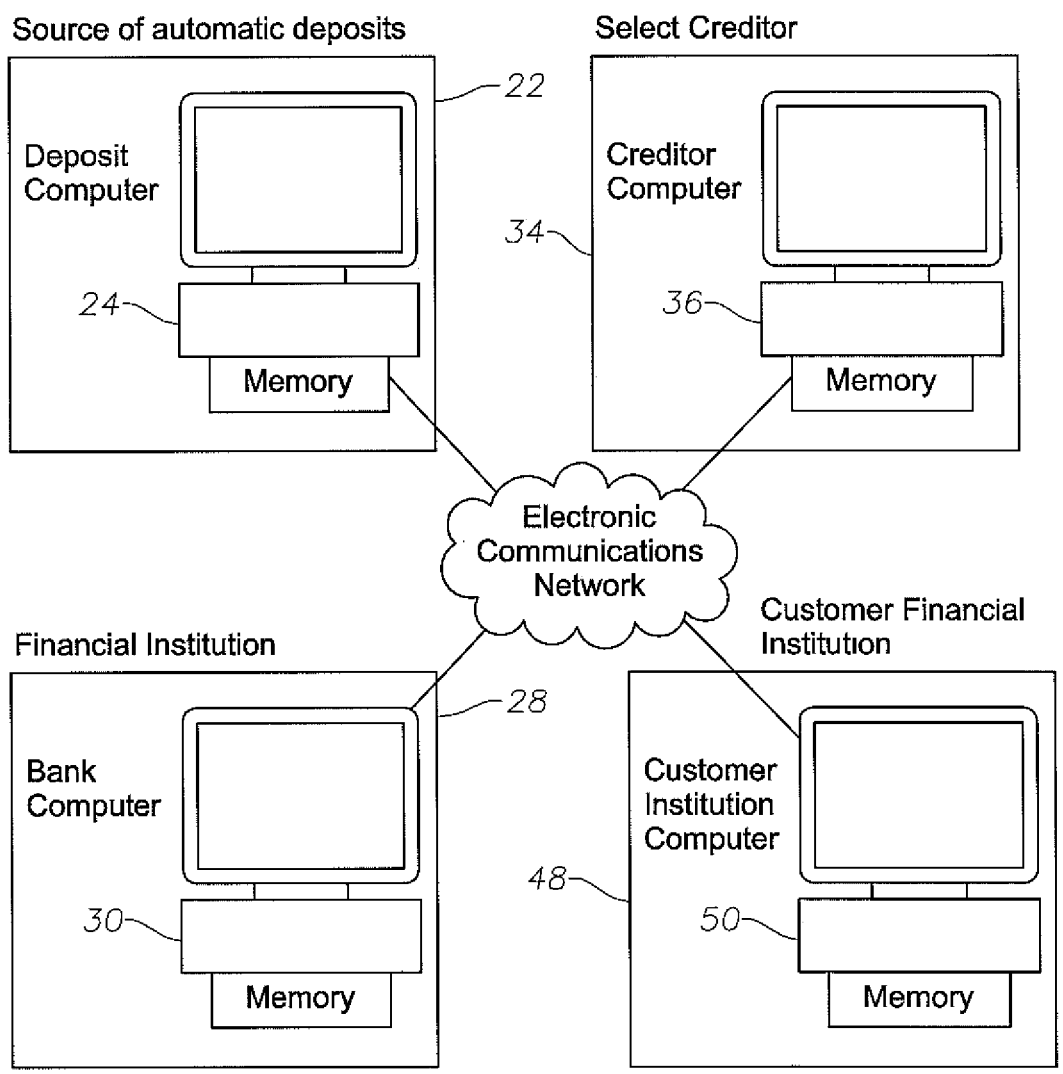
FIG. 5 is a schematic block diagram of a system to provide prioritized payments for a customer bank account according to an embodiment of the present invention.
Figures 6, 7:
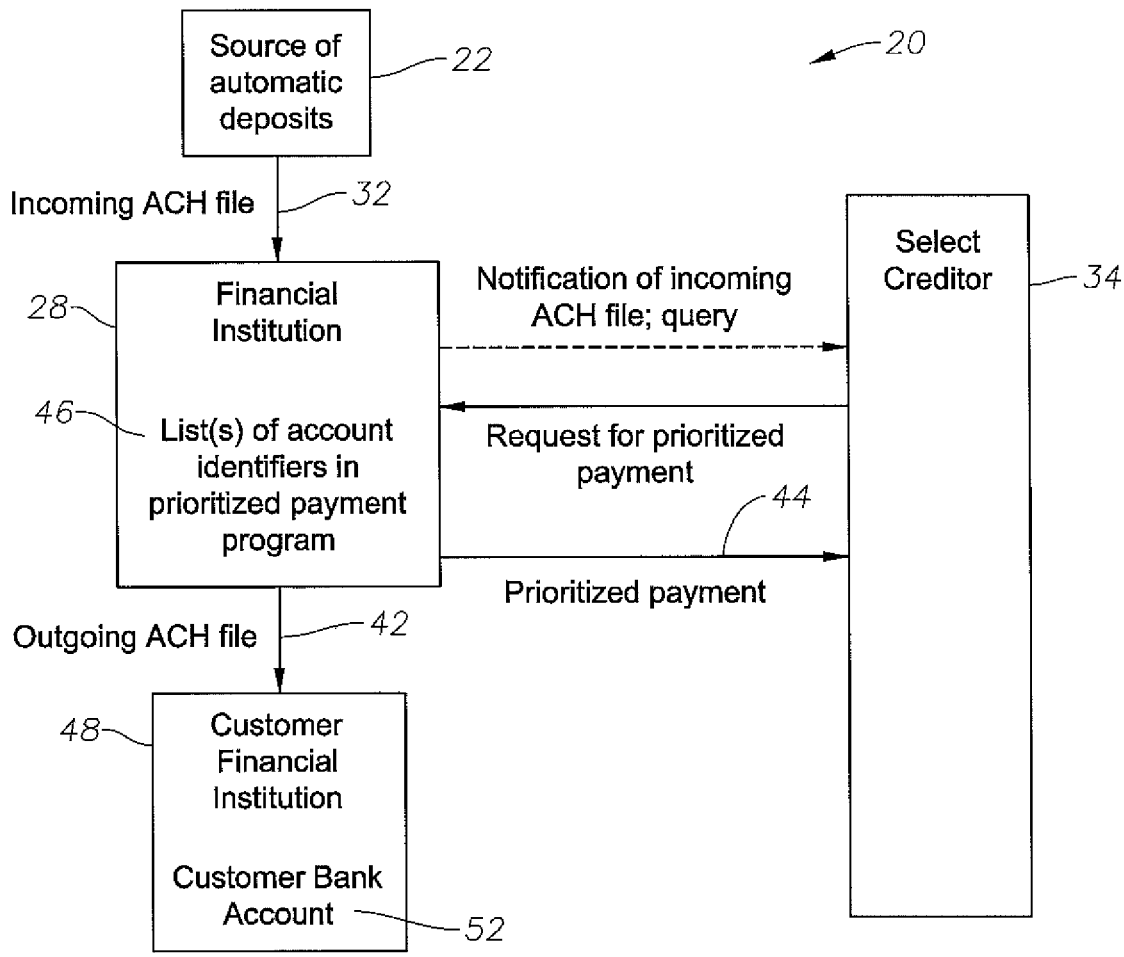
FIG. 6 is a schematic flow diagram of a system to provide prioritized payments for a customer bank account according to an embodiment of the present invention.
FIG. 7 is a partial list of prepaid card account identifiers for accounts enrolled in a prioritized payment program by a financial institution stored in memory of a computer and capable of being displayed on a display screen of a computer according to an embodiment of the present invention.

Embodiments of the present invention, as illustrated in FIGS. 3 and 4, for example, include bundling an entry for an automatic deposit with an entry for a prioritized payment to a select creditor in the same ACH file 42 directed to a prepaid card processor 40, so that the automatic deposit is credited to the customer prepaid card account 38 and relatively instantaneously any prioritized payment 44 to the select creditor 34 is debited from the account. In another embodiment of the present invention, as illustrated in FIGS. 5 and 6, for example, the ACH file 42 is directed to a customer financial institution 48 associated with a customer bank account 52.

Figure 10:
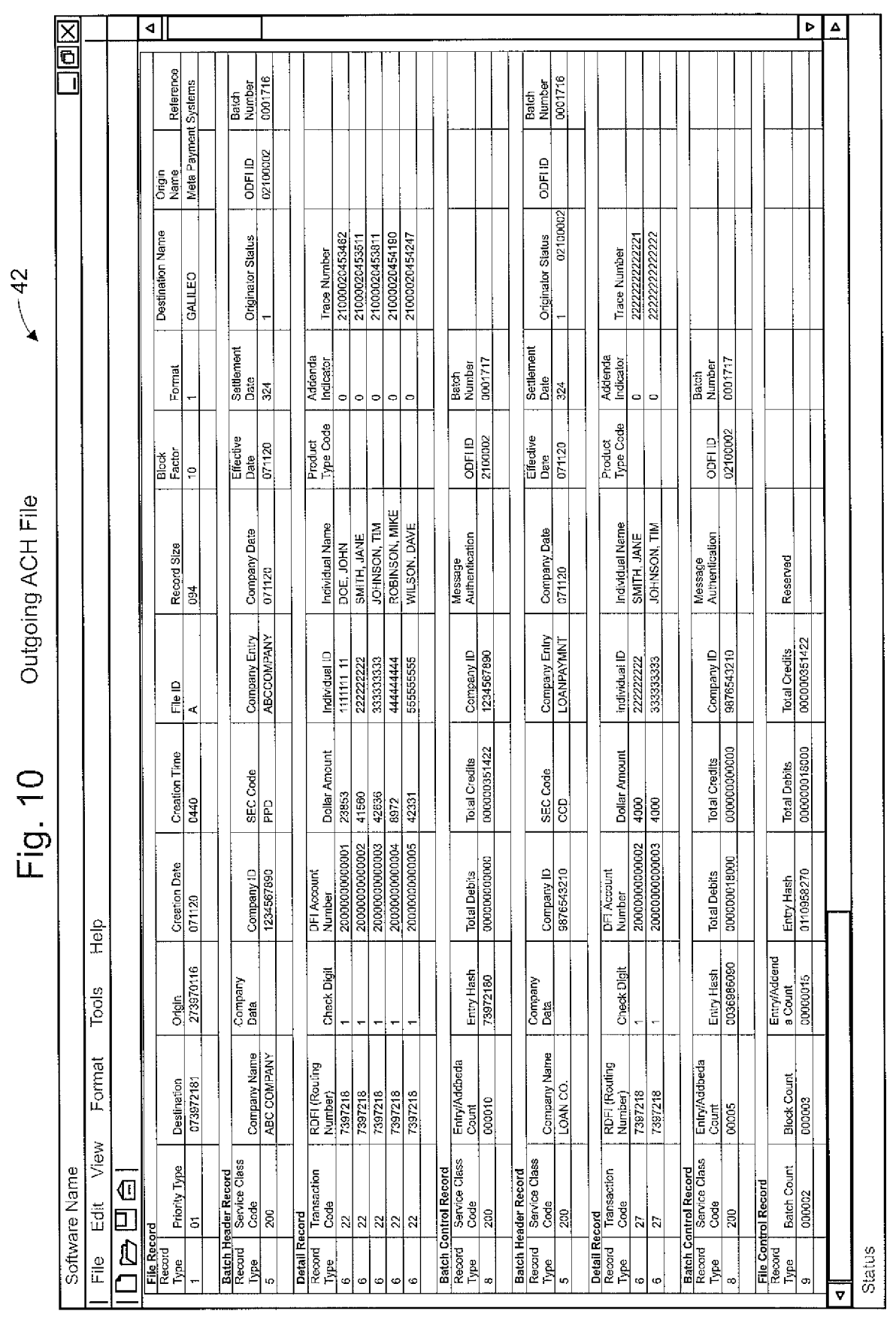

FIGS. 9 and 10 illustrate an excerpt of such an ACH file 42 according to an embodiment of the present invention. FIG. 10, for example, includes heading information in the ACH file 42 for illustration purposes. For the automatic deposit entries, the ACH file 42 includes a record type 42A, a transaction code 42B, routing number 42C, check digit 42D, a DFI account number 42E, the dollar amount 42F, an individual ID 42G, individual name 42H, product type code 421, addenda indicator 42J, and trace number 42K, as understood by those skilled in the art. Likewise, all of this information is included for the prioritized payment entries. As illustrated in FIG. 10, an ACH file 42, for example, may be a batch file, as understood by those skilled in the art. With this information and organization, according to embodiments of the present invention, the prepaid card processor 40 or the customer financial institution 48 processes the ACH file 42 so that the automatic deposit is credited to the customer account and relatively instantaneously any prioritized payment 44 to the select creditor 34 is debited from the account.

By offering prioritized payments, the embodiments of the present invention enable the offering of new products and promotions. According to the embodiments of the present invention, these new products and promotions can require a customer to enroll in the prioritized payment program as a condition of a transaction. The financial institution 28 maintains the list(s) of accounts enrolled in the prioritized payment program 46. Therefore, a utility customer can receive a discounted rate, as understood by those skilled in the art, if the utility company receives a prioritized payment 44 each month from the proceeds of the customer's payroll, a source of an automatic deposit 22, according to the embodiments of the present invention.

In an exemplary embodiment of the present invention, a customer is required to enroll in the prioritized payment program as a condition of a loan. The financial institution 28 maintains the list(s) of accounts enrolled in the prioritized payment program 46. In another exemplary embodiment of the present invention, a merchant is eligible for a discounted small business loan rate if the merchant routes the automatic deposit of the merchants credit card receipts to a transfer account and allows that bank prioritized loan payments 44 from the credit card receipts funds. As understood by those skilled in the art, credit card receipts are a source of automatic deposits 22. Embodiments of the present invention provide, for example, for credit or a loan from the financial institution defining a first financial institution or by a second financial institution different and remote from the first financial institution. That is, the financial institution can provide the transfer account and related products and services in conjunction with its own efforts to extend credit or in conjunction with lending and credit efforts by another financial institution or institutions.

FIG. 8 illustrates an excerpt of an incoming ACH file 32 with automatic deposit entries stored in memory of a computer and capable of being displayed on a display screen of a computer, as received by the financial institution 28. As understood by those skilled in the art, the incoming ACH file 32 includes header and batch information 100 about the ACH file, such as origin, destination, and record size and type. The incoming ACH file 32 is a batch file with multiple entries for automatic deposits, for example, from ABC COMPANY to various individuals, such as DOE, JOHN, at various institutions according to an embodiment of the present invention.

Figure 12:
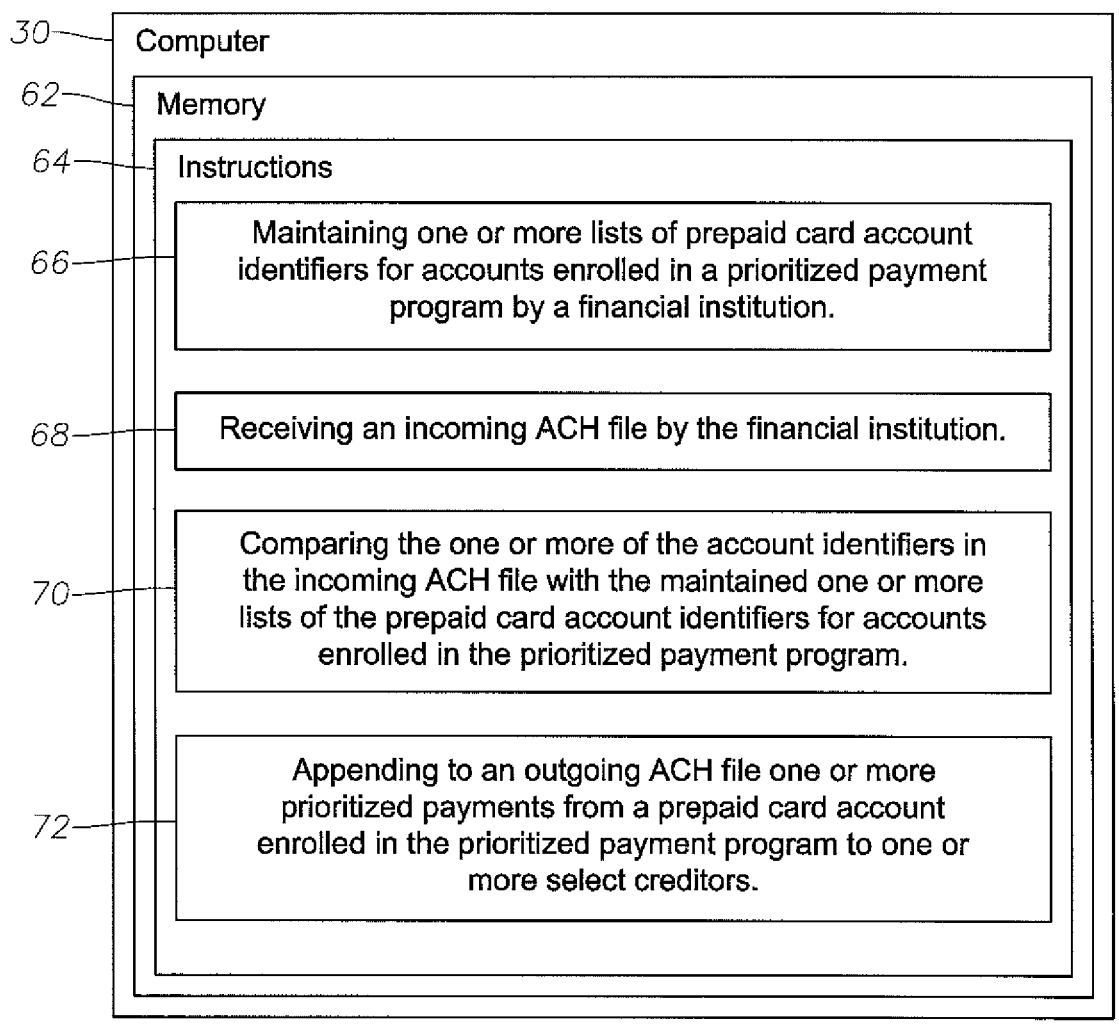
FIG. 12 is a schematic diagram of a program product stored in memory and executable by a computer according to an embodiment of the present invention.
Figure 14:
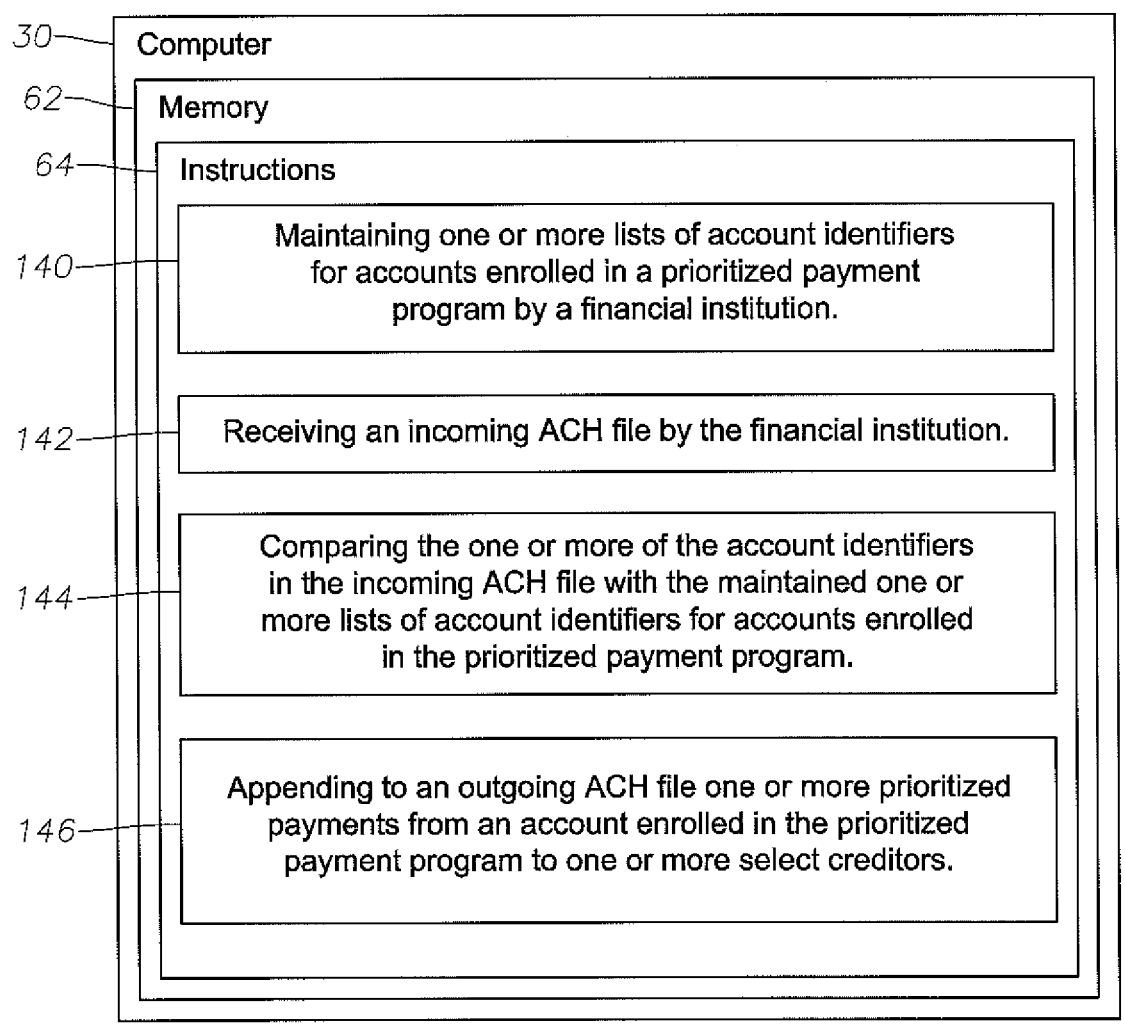
FIG. 14 is a schematic diagram of a program product stored in memory and executable by a computer according to another embodiment of the present invention.

According to embodiments of the present invention, a computer program product 64, as illustrated in FIGS. 12 and 14, associated with the financial institution computer 30, stored on a tangible computer memory media 62, and operable on a computer 30. The computer program product, for example, includes a set of instructions 64 that, when executed by the computer, cause the computer to perform various operations as described herein. The computer program product 64 can maintain one or more lists of accounts enrolled in the prioritized payment program by a financial institution (blocks 66, 140). FIG. 7 illustrates an example of such a list, according to embodiments of the present invention. After receiving the incoming ACH file by the financial institution (blocks 68, 142), the computer program product, according to an embodiment of the present invention, compares the accounts in the incoming ACH file with the maintained lists (blocks 70, 144). Then, the computer program product, according to an embodiment of the present invention, formulates one or more outgoing ACH files 42, responsive to the incoming ACH file 32, and appends to the file a prioritized payment 44 from an account enrolled in the prioritized payment program to a select creditor 34 (blocks 72, 146) in the event of an unfilled pre-authorized payment request by a creditor computer 36. This, for example, transforms the file from one type to a different file type. Therefore, according to embodiments of the present invention, the automatic deposit is credited to the customer bank account 52 or prepaid card account 38 and relatively instantaneously the prioritized payment to the creditor computer is debited from the same account.

According to embodiments of the present invention, sources of automatic deposits 22 include: employer-initiated direct deposit of payroll, a federal or state government-initiated electronic transfer of benefits payment, and a bank-initiated payment to a merchant for credit card sales. According to embodiments of the present invention, recurring automatic deposits funds also include annuities, dividends, interest payments, lottery winnings, royalty payments, and other streams of payments as understood by those skilled in the art.

Figure 13:
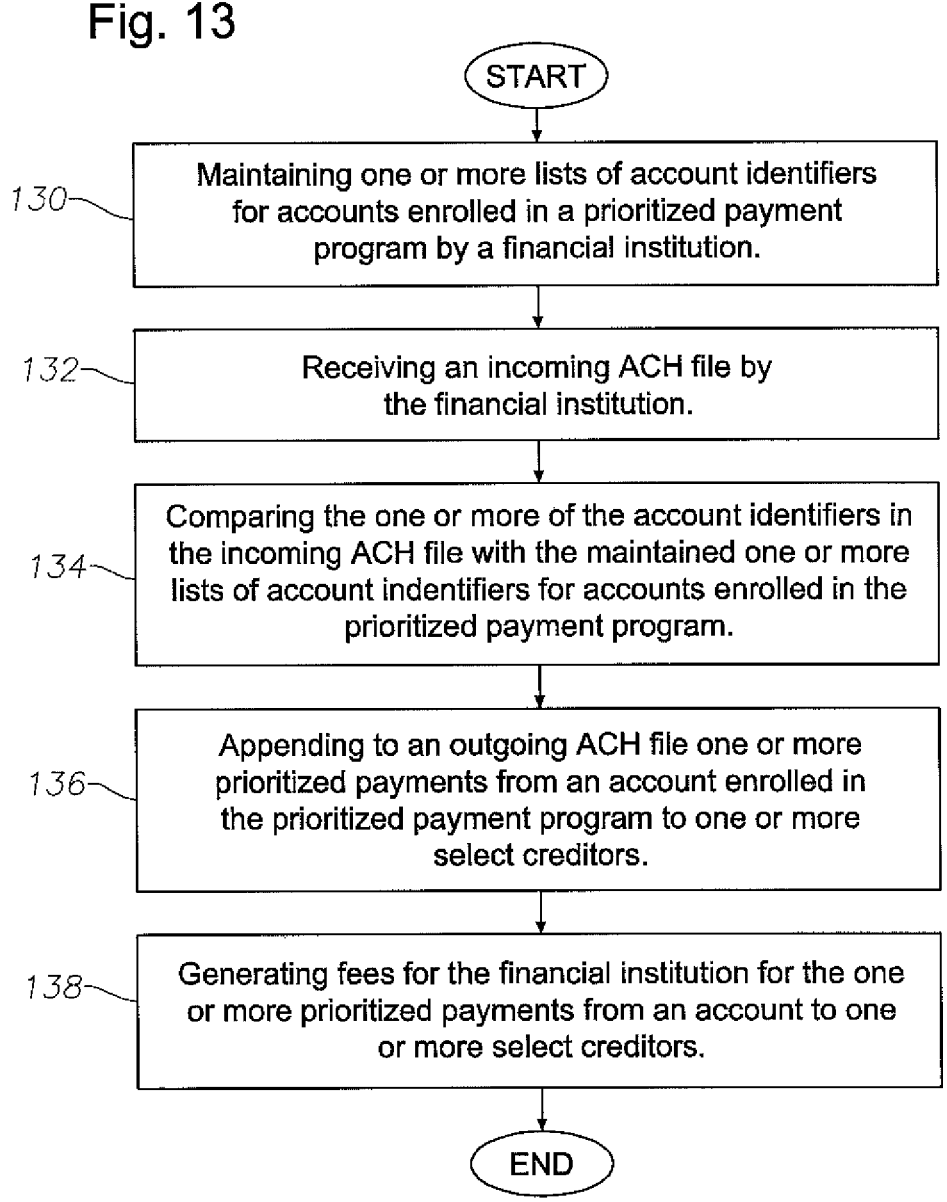
FIG. 13 is a flow diagram of a computer-implemented method of prioritized payments according to another embodiment of the present invention.

Embodiments of the present invention include computerized or computer-implemented methods of providing prioritized payments, as illustrated in FIGS. 11 and 13. According to embodiments of the present invention, for example, a financial institution enrolls customer accounts by use of a computer and flagging or identifying the customer as an enrollee, whether prepaid card accounts (see FIG. 11) or deposit accounts at another financial institution (see FIG. 13), in a prioritized payment program. As part of enrolling in the prioritized payment program, the customer pre-authorizes payment requests by one or more select creditors from the account. The financial institution computer maintains one or more lists of account identifiers for accounts enrolled in the program (blocks 80, 130). Next, the financial institution computer receives an incoming ACH file (blocks 82, 132), for example, in the form of a batch file as understood by those skilled in the art, including one or more automatic deposits for an account enrolled in the prioritized payment program. The financial institution computer has instructions stored in memory that compare the account identifiers in the incoming ACH file with the maintained lists of enrolled account identifiers (blocks 84, 134). For each account enrolled in the prioritized payment program with an unfilled pre-authorized payment request by a select creditor, the financial institution computer appends to an outgoing ACH file one or more prioritized payments responsive to the unfilled pre-authorized payment requests (blocks 86, 136). The new outgoing ACH file includes entries for the automatic deposit from the incoming ACH file and entries for the prioritized payments, so that the automatic deposit is credited to the account and relatively instantaneously any prioritized payment to a select creditor is debited from the account, resulting in the customer effectively having access only to any surplus funds. In addition, the financial institution computer has instructions that generate fees for the prioritized payments (blocks 88, 138); the fees can be based per account, per transaction, per vendor, or otherwise as understood by those skilled in the art.

Embodiments of the present invention also provide a system 20 to provide prioritized payments from the proceeds of an automatic deposit to a prepaid card account, as illustrated in FIGS. 3 and 4. The system 20 includes a first computer associated with a source of automatic deposits 22, defining a deposit computer 24. The deposit computer provides information for an automatic deposit for a customer through an electronic communications network 26. The system 20 also includes one or more second computers associated with a financial institution 28, defining a bank computer 30, in communication with the deposit computer 24 through the electronic communications network 26. The bank computer receives and processes an ACH file 32 including the information for the automatic deposit for the customer from the deposit computer 24. The bank computer includes software as illustrated in FIGS. 12 and 14 and discussed below. The system 20 further includes a third computer associated with a select creditor 34, defining a creditor computer 36, in communication with the bank computer 30 through the electronic communications network 26. As part of enrolling in the prioritized payment program, the customer pre-authorizes certain requests by the creditor computer 36 and routes the automatic deposits from the source of automatic deposits 22 to the bank computer 30 associated with the financial institution 28 having the prioritized payment program. The creditor computer 36, in turn, has instructions to request a prioritized payment from the bank computer 30 and receive a prioritized payment 44 from the customer as described below. The system 20 also includes a fourth computer associated with a customer prepaid card account 38 defining a prepaid card processor 40 as understood by those skilled in the art. The prepaid card processor receives an outgoing ACH file 42 from the bank computer 30 through the electronic communications network 26 and, responsive to the ACH file, credits the automatic deposit proceeds to the prepaid card account 38 and debits relatively instantaneously any prioritized payment 44 to the creditor computer 36 from the prepaid card account 38 through the electronic communications network 26. In turn, this movement of data based on instructions stored on the respective computers allows the display of data to a customer or merchant on available funds, e.g., based on a load on a prepaid card, to show only available funds after the prioritized payment deductions have occurred responsive to the instructions.

Embodiments of the present invention also provide a system 20 to provide prioritized payments from the proceeds of an automatic deposit to a customer bank account, as illustrated in FIGS. 5 and 6. The system 20 includes a first computer associated with a source of automatic deposits 22, defining a deposit computer 24. The deposit computer provides information for an automatic deposit for a customer through an electronic communications network 26. The system 20 also includes second computer associated with a financial institution 28, defining a bank computer 30, in communication with the deposit computer 24 through the electronic communications network 26. The bank computer receives and processes an ACH file 32 including the information for the automatic deposit for the customer from the deposit computer 24. The bank computer includes software or program product stored in memory as instructions and executable by the computer as illustrated in FIGS. 12 and 14 and discussed below. The system 20 further includes a third computer associated with a select creditor 34, defining a creditor computer 36, in communication with the bank computer 30 through the electronic communications network 26. As part of enrolling in the prioritized payment program, the customer pre-authorizes certain requests by the creditor computer 36 and routes the automatic deposits from the source of automatic deposits 22 to the bank computer 30 associated with the financial institution 28 having the prioritized payment program. The creditor computer 36 can request a prioritized payment from the bank computer 30 and receive a prioritized payment 44 from the customer as described below. The system 20 also includes a fourth computer a second financial institution 28 associated with a customer bank account 52 defining a customer institution computer 50. The customer institution computer 50 receives an outgoing ACH file 42 from the bank computer 30 through the electronic communications network 26 and, responsive to the ACH file, credits the automatic deposit proceeds to the customer bank account 52 and debits relatively instantaneously any prioritized payment 44 to the creditor computer 36 from the customer bank account 52 through the electronic communications network 26.

In addition, the embodiments of the present invention include a computer program product, as illustrated in FIGS. 12 and 14, associated with the bank computer, stored on a tangible computer memory media 62, operable on a computer 30. Embodiments of the computer program can include, for example, modules adapted to perform one or more operations. The computer program product, for example, includes a set of instructions 64 that, when executed by the computer, cause the computer to perform various operations as described herein. The operations can include maintaining one or more lists 46 of account identifiers for accounts enrolled in a prioritized payment program by the financial institution 28 (blocks 66, 140). The operations also include receiving an incoming ACH file 32 by the bank computer 30 (blocks 68, 142). The ACH file 32 includes one or more account identifiers associated with an automatic deposit, for example, an automatic deposit destined for a prepaid card account 38. The operations further include comparing the account identifiers in the incoming ACH file 32 with one or more maintained lists 46 of account identifiers for accounts enrolled in the prioritized payment program (blocks 70, 144). The operations also include appending to an outgoing ACH file 42, responsive to the incoming ACH file 32, a prioritized payment 44 from an account enrolled in the prioritized payment program to the select creditor computer 36 (blocks 72, 146), so that the automatic deposit is credited to the customer account 38 and relatively instantaneously the prioritized payment to the creditor computer is debited from the account 38.

A person having ordinary skill in the art will recognize that various types of memory are readable by a computer such as described herein, e.g., deposit source computer, bank computer, credit computer, prepaid card processors, or other computers with embodiments of the present invention so that instruction stored in such memory are executable and cause various operations within the computer. Examples of computer readable media include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, memory sticks, and other newer types of memories, and transmission type media such as digital and analog communication links For example, such media can include operating instructions stored therein, as well as instructions related to the system and the method steps described above and can operate on a computer. It will be understood by those skilled in the art that such media can be at other locations instead of or in addition to the bank to store program products, e.g., including software, thereon. Embodiments of a system for providing prioritized payments, for example, can include a plurality of customer access interface devices as illustrated and described herein and one or more remote computer servers positioned to provide communication with each of the plurality of customer access interface devices and being associated with a financial institution. Each of these computer servers, for example, can having one or more of these various types of memory as understood by those skilled in the art.

This application is a continuation of and claims the benefit and priority to U.S. patent application Ser. No. 12/338,584 titled "Transfer Account Systems, Computer Program Products, And Associated Computer-Implemented Methods" filed on Dec. 18, 2008, which claims priority to and the benefit of U.S. Provisional Patent Application Ser. No. 61/016,213, by Sorbe et al., titled "Transfer Account Systems, Computer Program Products, and Associated Methods" filed Dec. 21, 2007, and U.S. Provisional Patent Application Ser. No. 61/052,454, by Sorbe et al., titled "Transfer Account Systems, Computer Program Products, and Methods to Prioritize Payments from Preselected Bank Account" filed May 12, 2008, all of which are each incorporated herein by reference in their entireties. This application also relates to U.S. patent pplication Ser. No. 12/338,402, by Sorbe et al., titled "Transfer Account Systems, Computer Program Products, and Associated Computer-Implemented Methods" filed on Dec. 18, 2008; U.S. patent application Ser. No. 12/338,440, by Sorbe et al., titled "Transfer Account Systems, Computer Program Products, and Associated Computer-Implemented Methods" filed on Dec. 18, 2008; U.S. patent application Ser. No. 12/338,645, by Sorbe et al., titled "Transfer Account Systems, Computer Program Products, and Computer-Implemented Methods to Prioritize Payments from Preselected Bank Account" filed on Dec. 18, 2008; and U.S. application Ser. No. 12/389,749 filed on Feb. 29, 2009 titled "Methods to Advance Loan Proceeds On Prepaid Cards, Associated Systems and Computer Program Products, which claims priority and benefit to U.S. Provisional Patent Application Ser. No. 61/029,975 filed on Feb. 20, 2008 titled the same, each and all of which are incorporated herein by reference in their entireties.

This application is also a continuation of and claims the benefit and priority to U.S. patent application Ser. No. 13/782,550 titled "Transfer Account Systems, Computer Program Products, And Associated Computer-Implemented Methods" filed Mar. 1, 2013, which claims priority to U.S. patent application Ser. No. 13/282,186, now U.S. Pat. No. 8,392,299, titled "Transfer Account Systems, Computer Program Products, And Associated Computer-Implemented Methods" filed Oct. 26, 2011, which claims priority to and the benefit of U.S. patent application Ser. No. 12/338,365, now U.S. Pat. No. 8,055,557, titled "Transfer Account Systems, Computer Program Products, and Associated Computer-Implemented Methods" filed on Dec. 18, 2008, which claims priority to and the benefit of U.S. Provisional Patent Application Ser. No. 61/016,213, by Sorbe et al., titled "Transfer Account Systems, Computer Program Products, and Associated Methods" filed Dec. 21, 2007, all of which are each incorporated herein by reference in their entireties.

The invention claimed is:

1. A machine to provide prioritized payments directly from each of plurality of automatic deposits prior to being made available to one or more enrollees enrolled for prioritized payments, the machine comprising:

a computer being associated with a financial institution to thereby define a financial institution computer, the financial institution computer being configured to control a plurality of intermediary accounts with the financial institution, receive a plurality of electronic deposits from a plurality of depository institution computers to define a plurality of automatic deposits, and to communicate with a plurality of remote computers positioned remote from the financial institution computer and associated with a plurality of card processors to thereby define a plurality of card processor computers each being configured to control access to a plurality of card user accounts; and non-transitory computer memory encoded with computer program operable on the financial institution computer to perform one or more processes of providing prioritized payments to one or more select creditors from the plurality of automatic deposits, the computer program comprising a set of instructions that when executed by the financial institution computer cause the financial institution computer to perform the operations of:

creating one or more of the plurality of intermediary accounts for each of a plurality of enrollees enrolled in prioritized payments with the financial institution, each of the intermediary accounts being inaccessible by the plurality of enrollees and adapted to receive funds for a benefit of one or more of the plurality of enrollees, identifying one or more of the plurality of enrollees with one or more account identifiers listed in one or more received incoming Automated Clearinghouse (ACH) files by comparing each of the one or more account identifiers to a list of respective account identifiers for the one or more of the plurality of enrollees, the one or more incoming ACH files being received from one or more of the plurality of depository institution computers and associated with one or more of the plurality of automatic deposits, wherein the one or more of the plurality of automatic deposits includes one or more of the following: an employer-initiated direct deposit of payroll; a government-initiated electronic transfer of benefits payment; and a bank-initiated payment to a merchant for credit card sales;

determining, responsive to identifying the one or more of the plurality of enrollees with the one or more account identifiers, a value of one or more unfilled pre-authorized payment requests associated with the one or more of the plurality of enrollees with the one or more account identifiers to define one or more prioritized payments, the one or more unfilled pre-authorized requests being made by one or more select creditors, generating the one or more prioritized payments from one or more of the plurality intermediary accounts with the one or more account identifiers to the one or more select creditors responsive to determining the value of the one or more prioritized payments, the one or more prioritized payments being directly deducted from the one or more of the plurality of automatic deposits, wherein generating the one or more prioritized payments comprises electronically appending the one or more prioritized payments to the incoming ACH file to create an outgoing ACH file for each of the one or more of the plurality of enrollees, the outgoing ACH file having entries for the one or more of the plurality of the automatic deposits from the incoming ACH file and entries for the one or more prioritized payments, and generating, responsive to the outgoing ACH file, a payment from the one or more of the plurality intermediary accounts to one or more of the plurality of card user accounts via a prepaid card processor that receives the outgoing ACH file and for the benefit of the one or more of the plurality of enrollees, a value of the payment being a value of the one or more of the plurality of automatic deposits less the value of the one or more prioritized payments to thereby define one or more sweep payments, the one or more of the plurality of enrollees only having access to one or more of the plurality of the automatic deposits less the one or more prioritized payments, each of the plurality of card user accounts associated with a prepaid card, such that the one or more sweep payments are defined as the value of the one or more of the plurality of automatic deposits less the value of the one or more prioritized payments and less any fees for providing the prioritized payments; and generating fees for the financial institution for the one or more prioritized payments to the one or more select creditors when the one or more prioritized payments are appended to the outgoing ACH file.

2. A machine as defined in claim 1, wherein one or more of the unfilled payment requests are initiated in response to a query from the financial institution computer responsive to the financial institution computer identifying the one or more of the plurality of enrollees with the one or more account identifiers; and wherein the one or more sweep payments are generated within twenty-four hours of receiving the incoming ACH file.

3. A machine as defined in claim 2, wherein the generating the one or more prioritized payments to the one or more select creditors step further includes the value of the one or more prioritized payments comprises a first value for a first time period and a second value different than the first value for a second time period different from the first time period, and wherein the intermediary accounts are configured so that deductions from funds received by one or more of the intermediary accounts are controlled by the financial institution.

4. A machine as defined in claim 1, wherein the one or more prioritize prioritized payments are customer-initiated payments, including one or more of the following: a gift card purchase, a remittance to family located outside of a country where an account holder is located, and a bill payment to a third-party.

5. Non-transitory computer memory encoded with computer program on a computer being associated with a financial institution to thereby define a financial institution computer configured to control access to a plurality of intermediary accounts associated with the financial institution and receive a plurality of electronic deposits from a plurality of depository institution computers to define a plurality of automatic deposits, the computer program comprising a set of instructions that when executed by the financial institution computer cause the financial institution computer to perform the operations of:

creating one or more of a plurality of intermediary accounts for each of a plurality of enrollees enrolled in prioritized payments with the financial institution, each of the intermediary accounts being inaccessible by the plurality of enrollees and adapted to receive funds for a benefit of one or more of the plurality of enrollees;

identifying one or more of the plurality of enrollees with one or more account identifiers listed in one or more received Automated Clearinghouse (ACH) incoming files by comparing each of the one or more account identifiers to a list of respective account identifiers for the one or more of the plurality of enrollees, the one or more incoming ACH files being received from one or more of the plurality of depository institution computers and associated with one or more of a plurality of automatic deposits, wherein the one or more of the plurality of automatic deposits includes one or more of the following: an employer-initiated direct deposit of payroll; a government-initiated electronic transfer of benefits payment; and a bank-initiated payment to a merchant for credit card sales;

determining, responsive to identifying the one or more of the plurality of enrollees with the one or more account identifiers, a value of one or more unfilled pre-authorized payment requests associated with the one or more of the plurality of enrollees with the one or more account identifiers to define one or more prioritized payments, generating the one or more prioritized payments from one or more of the plurality intermediary accounts with the one or more account identifiers to one or more select creditors responsive to determining the value of the one or more prioritized payments, the one or more prioritized payments being directly deducted from the one or more of the plurality of automatic deposits, wherein generating the one or more prioritized payments comprises electronically appending the one or more prioritized payments to the incoming ACH file to create an outgoing ACH file for each of the one or more of the plurality of enrollees, the outgoing ACH file having entries for the one or more of the plurality of the automatic deposits from the incoming ACH file and entries for the one or more prioritized payments, and generating, responsive to the outgoing ACH file, a payment from the one or more of the plurality intermediary accounts to one or more of the plurality of card user accounts via a prepaid card processor that receives the outgoing ACH file and for the benefit of the one or more of the plurality of enrollees, a value of the payment being a value of the one or more of the plurality of automatic deposits less the value of the one or more prioritized payments to thereby define one or more sweep payments, the one or more of the plurality of enrollees only having access to one or more of the plurality of the automatic deposits less the one or more prioritized payments, each of the plurality of card user accounts associated with a prepaid card, such that the one or more sweep payments are defined as the value of the one or more of the plurality of automatic deposits less the value of the one or more prioritized payments and less any fees for providing the prioritized payments; and generating fees for the financial institution for the one or more prioritized payments to the one or more select creditors when the one or more prioritized payments are appended to the outgoing ACH file.

6. Non-transitory computer medium as defined in claim 5, wherein one or more of the unfilled payment requests are initiated in response to a query from the financial institution computer responsive to the financial institution computer identifying the one or more of the plurality of enrollees with the one or more account identifiers.

7. Non-transitory computer medium as defined in claim 6, wherein the generating the one or more prioritized payments to the one or more select creditors step further includes the value of the one or more prioritized payments comprises a first value for a first time period and a second value different than the first value for a second time period different from the first time period, and wherein deductions from funds received by one or more of the intermediary accounts being controlled by the financial institution.

8. Non-transitory computer medium as defined in claim 5, wherein the one or more prioritized payments are customer-initiated payments, including one or more of the following: a gift card purchase, a remittance to family located outside of a country where an account holder is located, and a bill payment to a third-party.

9. Non-transitory computer medium as defined in claim 5, wherein enrollment for prioritized payments are required as a condition of a loan, wherein accounts for the one or more select creditors are remote from the financial institution computer and a plurality of the card processors, and
wherein the computer program causes the financial institution computer to perform the operation of: deducting a fee from the one or more sweep payments.

10. Non-transitory computer medium as defined in claim 5, wherein the financial institution is a federally-chartered bank subject to federal banking laws and regulations and not subject to state banking laws and regulations.

11. A computer-implemented method to be performed by a first computer being associated with a first financial institution to thereby define a first financial institution computer configured to control access to a plurality of intermediary accounts associated with the financial institution and receive a plurality of electronic deposits from a plurality of depository institution computers to define a plurality of automatic deposits, the method comprising:
creating, by a computer associated with a first financial institution to define a first financial institution computer, one or more of a plurality of intermediary accounts for each of a plurality of enrollees enrolled in prioritized payments with the financial institution, each of the intermediary accounts being inaccessible by the plurality of enrollees and adapted to receive funds for a benefit of one or more of the plurality of enrollees;
identifying, by the first financial institution computer, one or more of the plurality of enrollees with one or more account identifiers listed in one or more received incoming Automated Clearinghouse (ACH) files by comparing each of the one or more account identifiers to a list of respective account identifiers for the one or more of the plurality of enrollees, the one or more incoming ACH files being received from one or more of the plurality of depository institution computers and associated with one or more of a plurality of automatic deposits, wherein the one or more of the plurality of automatic deposits includes one or more of the following: an employer-initiated direct deposit of payroll; a government-initiated electronic transfer of benefits payment; and a bank-initiated payment to a merchant for credit card sales;
determining, by the financial institution computer responsive to identifying the one or more of the plurality of enrollees with the one or more account identifiers, a value of one or more unfilled pre-authorized payment requests associated with the one or more of the plurality of enrollees with the one or more account identifiers to define one or more prioritized payments, the one or more unfilled pre-authorized requests being made by one or more select creditors,
generating, by the financial institution computer, the one or more prioritized payments from one or more of the plurality intermediary accounts with the one or more account identifiers to the one or more select creditors responsive to determining the value of the one or more prioritized payments, the one or more prioritized payments being directly deducted from the one or more of the plurality of automatic deposits, wherein generating the one or more prioritized payments comprises electronically appending the one or more prioritized payments to the incoming ACH file to create an outgoing ACH file for each of the one or more of the plurality of enrollees, the outgoing ACH file having entries for the one or more of the plurality of the automatic deposits from the incoming ACH file and entries for the one or more prioritized payments, and generating, responsive to the outgoing ACH file, a payment from the one or more of the plurality intermediary accounts to one or more of the plurality of card user accounts via a prepaid card processor that receives the outgoing ACH file and for the benefit of the one or more of the plurality of enrollees, a value of the payment being a value of the one or more of the plurality of automatic deposits less the value of the one or more prioritized payments to thereby define one or more sweep payments, the one or more of the plurality of enrollees only having access to one or more of the plurality of the automatic deposits less the one or more prioritized payments, each of the plurality of card user accounts associated with a prepaid card, such that the one or more sweep payments are defined as the value of the one or more of the plurality of automatic deposits less the value of the one or more prioritized payments and less any fees for providing the prioritized payments; and generating fees for the financial institution for the one or more prioritized payments to the one or more select creditors when the one or more prioritized payments are appended to the outgoing ACH file.

12. A computer-implemented method as defined in claim 11, wherein one or more of the unfilled payment requests are initiated in response to a query from the first financial institution computer responsive to the first financial institution computer identifying the one or more of the plurality of enrollees associated with the one or more account identifiers.

13. A computer-implemented method as defined in claim 12, wherein the generating the one or more prioritized payments to the one or more select creditors step further includes the value of the one or more prioritized payments comprises a first value for a first time period and a second value different than the first value for a second time period different from the first time period, and wherein deductions from funds received by one or more of the intermediary accounts are controlled by the financial institution.

14. A computer-implemented method as defined in claim 11,
wherein the one or more prioritize prioritized payments are customer-initiated payments, including one or more of the following: a gift card purchase, a remittance to family located outside of a country where an account holder is located, and a bill payment to a third-party.

15. A computer-implemented method as defined in claim 11, wherein enrollment for the prioritized payment is required as a condition of a loan, wherein accounts for the one or more select creditors are remote from the first financial institution computer and a plurality of the second financial institution computers associated with the plurality customer user accounts, and
wherein the method further comprising: deducting a fee from the one or more prioritized payments.

16. A computer-implemented method as defined in claim 11, wherein the first financial institution is a federally-chartered bank subject to federal banking laws and regulations and not subject to state banking laws and regulations.

17. A computer-implemented method as defined in claim 11, wherein each of the plurality of customer user accounts are prepaid card accounts and are associated with a prepaid card, wherein the one or more sweep payments are define as the value of the automatic deposit less the value of the one or more prioritized payments and less any fees for providing the prioritized payments.

18. A computer-implemented method as defined in claim 17, wherein one or more of the unfilled payment requests are initiated in response to a query from the first financial institution computer responsive to the first financial institution computer identifying the one or more of the plurality of enrollees associated with the one or more account identifiers.

* * * * *